(12) United States Patent
Nesteroff et al.

(10) Patent No.: US 10,997,356 B1
(45) Date of Patent: May 4, 2021

(54) COMPUTING DEVICE USER INTERFACE HAVING AUTO-GROUPING OF DATA COLUMNS

(71) Applicant: Juniper Networks, Inc., Sunnyvale, CA (US)

(72) Inventors: Lyubov Nesteroff, Pleasant Hill, CA (US); Andrew S. Chasin, Los Gatos, CA (US); Yelena Kozlova, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 125 days.

(21) Appl. No.: 15/596,059

(22) Filed: May 16, 2017

(51) Int. Cl.
*G06F 40/103* (2020.01)
*G06F 40/177* (2020.01)
*G06F 40/183* (2020.01)

(52) U.S. Cl.
CPC .......... *G06F 40/103* (2020.01); *G06F 40/177* (2020.01); *G06F 40/183* (2020.01)

(58) Field of Classification Search
CPC .................................................... G06F 17/211
USPC ........................................................ 715/227
See application file for complete search history.

(56) References Cited

U.S. PATENT DOCUMENTS

| 6,016,502 | A * | 1/2000 | Haneda .................. G06F 3/0481 715/212 |
| 7,685,510 | B2 * | 3/2010 | Sauermann ........... G06F 40/103 715/227 |
| 8,065,603 | B2 * | 11/2011 | Gossweiler, III ..... G06F 3/0483 715/227 |
| 8,223,134 | B1 | 7/2012 | Forstall et al. |
| 8,689,095 | B2 * | 4/2014 | Parish ..................... G06F 40/18 715/212 |
| 9,015,572 | B2 | 4/2015 | Lanza et al. |
| 9,400,776 | B1 * | 7/2016 | Kennedy, Jr. ......... G06F 40/106 |

(Continued)

FOREIGN PATENT DOCUMENTS

WO 2016193679 A1 12/2016

OTHER PUBLICATIONS

Bootstrap, "Scaffolding: Bootstrap is built on responsive 12-column grids, layouts, and components" (Year: 2016).*

(Continued)

*Primary Examiner* — Ariel Mercado
*Assistant Examiner* — Ariel Mercado Vargas
(74) *Attorney, Agent, or Firm* — Shumaker & Sieffert, P.A.

(57) ABSTRACT

This disclosure describes techniques for intelligently grouping, ungrouping, collapsing, and/or expanding columns of data for effective presentation on a display screen. In one example, a method includes accessing, by a computing device, data organized into a plurality of columns, each column having one or more data characteristics; determining, by the computing device and based on at least some of the data characteristics of the columns, one or more column groups, each column group including a subset of the plurality of columns; determining, by the computing device and based on attributes of a window for presentation of the data, whether the plurality of columns will fit within the window; and in response to determining that the plurality of columns will not fit within the window, outputting a user interface presenting a column group as a single column within the window so that the plurality of columns fits within the window.

20 Claims, 16 Drawing Sheets

(56) References Cited

U.S. PATENT DOCUMENTS

| | | |
|---|---|---|
| 2005/0216504 A1 | 9/2005 | Delvat et al. |
| 2006/0107196 A1 | 5/2006 | Thanu et al. |
| 2006/0174189 A1 | 8/2006 | Weitzman et al. |
| 2006/0288267 A1 | 12/2006 | Despain |
| 2008/0270886 A1* | 10/2008 | Gossweiler ............ G06F 40/177 715/227 |
| 2013/0055167 A1 | 2/2013 | Leong et al. |
| 2014/0164896 A1 | 6/2014 | Schlereth |
| 2014/0372874 A1* | 12/2014 | Marseille .............. G06F 40/174 715/243 |
| 2015/0186352 A1 | 7/2015 | Greenwood |
| 2016/0085735 A1 | 3/2016 | Davis et al. |
| 2016/0162448 A1* | 6/2016 | Wang .................... G06F 40/106 715/236 |
| 2017/0147551 A1* | 5/2017 | Kalisz ................... G06F 40/177 |

OTHER PUBLICATIONS

"JQuery," .toggleClass( ) (Year: 2015).*

"Excel 2013: Groups and Subtotals," Goodwill Community Foundation Internatinoal—LearnFree.org, accessed on Aug. 11, 2017, from https://www.gcflearnfree.org/excel2013/groups-and-subtotals/1/, 7 pp.

Harkins, "Apply auto-fit property to multiple columns simultaneously," TechRepublic, Sep. 30, 2010, accessed from http://www.techrepublic.com/blog/microsoft-office/apply-auto-fit-property-to-multiple-columns-simultaneously/, 1 pp.

* cited by examiner

| Date | Zone | Category | Location | Source Zone +2 | Desination Zone +1 | Type | Elapsed |
|---|---|---|---|---|---|---|---|
| 1/23/2016 | Yellow | iota | 94111 | Trust | Black | sigma | 13:23 |
| 3/2/2017 | Gold | kappa | 10022 | Black | Trust | omega | 12:03 |
| 1/23/2016 | Blue | sigma | 20001 | Trust | Untrust | pi | 0:00 |
| 7/31/2016 | Green | theta | 89109 | White | Black | zeta | 4:21 |
| 3/2/2017 | Gold | alpha | 60614 | Trust | Untrust | lambda | 17:32 |
| 1/23/2016 | Red | kappa | 20036 | Internet | Untrust | tau | 8:28 |
| 8/31/2016 | Red | omega | 89145 | Trust | Trust | alpha | 7:45 |
| 5/31/2016 | Silver | pi | 10010 | Trust | Untrust | delta | 1:23 |
| 1/23/2016 | Gold | zeta | 60606 | White | Untrust | omega | 0:27 |
| 3/2/2017 | Black | phi | 94301 | Trust | Trust | sigma | 0:52 |
| 1/23/2016 | Gold | lambda | 95101 | Untrust | Black | delta | 4:59 |
| 1/23/2016 | Orange | tau | 94111 | Trust | Untrust | gamma | 3:37 |
| 3/2/2017 | Blue | alpha | 89145 | White | White | beta | 0:21 |
| 5/31/2016 | Green | delta | 94111 | Untrust | Untrust | phi | 0:22 |
| 5/31/2016 | Gold | omega | 95101 | Trust | Black | delta | 9:44 |
| 8/31/2016 | Blue | delta | 10010 | Untrust | Untrust | alpha | 8:19 |
| 1/23/2016 | Gold | alpha | 89109 | Untrust | Black | alpha | 2:59 |
| 3/2/2017 | Red | gamma | 60606 | Internet | Black | kappa | 3:00 |
| 3/2/2017 | Silver | beta | 10022 | Untrust | White | gamma | 6:12 |

| Category | Location | Source Zone | Source Address | Source ID | Destination Zone +1 | Type |
|---|---|---|---|---|---|---|
| iota | 94111 | Trust | Any | mjones | Black | sigma |
| kappa | 10022 | Black | 192.168.1.100 | jstevens | Trust | omega |
| sigma | 20001 | Trust | 172.22.111.201 | canderson | Untrust | pi |
| theta | 89109 | White | 172.22.111.201 | wilson | Black | zeta |
| alpha | 60614 | Trust | Any | smith | Untrust | lambda |
| kappa | 20036 | Internet | 172.22.111.201 | tjackson | Untrust | tau |
| omega | 89145 | Trust | Any | mjones | Trust | alpha |
| pi | 10010 | Trust | 172.22.111.201 | tjohnson | Untrust | delta |
| zeta | 60606 | White | 192.168.1.100 | jdavis | Untrust | omega |
| phi | 94301 | Trust | 172.22.111.201 | mtaylor | Trust | sigma |
| lambda | 95101 | Untrust | Any | hmoore | Black | delta |
| tau | 94111 | Trust | 192.168.1.100 | jwhite | Untrust | gamma |
| alpha | 89145 | White | 172.22.111.201 | mlee | White | beta |
| delta | 94111 | Untrust | Any | aharris | Untrust | phi |
| omega | 95101 | Untrust | 172.22.111.201 | tjackson | Untrust | delta |
| delta | 10010 | Trust | Any | canderson | Black | alpha |
| alpha | 89109 | Untrust | 192.168.1.100 | mjones | Untrust | alpha |
| gamma | 60606 | Internet | 172.22.111.201 | tjohnson | Black | kappa |

| Category | Location | Source Zone | Source Address | Source ID | Desination Zone | Destination |
|---|---|---|---|---|---|---|
| iota | 94111 | Trust | Any | mjones | Black | 192.168.22 |
| kappa | 10022 | Black | 192.168.1.100 | jstevens | Trust | 192.168.22 |
| sigma | 20001 | Trust | 172.22.111.201 | canderson | Untrust | 172.22.1 |
| theta | 89109 | White | Any | wilson | Black | 192.168.12 |
| alpha | 60614 | Trust | 172.22.111.201 | smith | Untrust | 192.168.12 |
| kappa | 20036 | Internet | Any | tjackson | Untrust | 192.168.12 |
| omega | 89145 | Trust | 172.22.111.201 | mjones | Trust | 192.168.22 |
| pi | 10010 | Trust | 192.168.1.100 | tjohnson | Untrust | 172.22.12 |
| zeta | 60606 | White | 172.22.111.201 | jdavis | Untrust | 192.168.22 |
| phi | 94301 | Trust | 172.22.111.201 | mtaylor | Trust | 192.168.22 |
| lambda | 95101 | Trust | Any | hmoore | Black | 172.22.12 |
| tau | 94111 | Untrust | 192.168.1.100 | jwhite | Untrust | 192.168.22 |
| alpha | 89145 | Trust | 172.22.111.201 | mlee | White | 192.168.22 |
| delta | 94111 | White | 172.22.111.201 | aharris | Untrust | 172.22.1 |
| omega | 95101 | Untrust | Any | tjackson | Untrust | 192.168.22 |
| delta | 10010 | Trust | 192.168.1.100 | canderson | Black | 192.168.22 |
| alpha | 89109 | Untrust | 172.22.111.201 | mjones | Untrust | 172.22.1 |
| gamma | 60606 | Internet | 172.22.111.201 | tjohnson | Black |  |

FIG. 3C

| Location | Source Zone | Category | Source Address | Source ID | Destination Zone | Destination A |
|---|---|---|---|---|---|---|
| 94111 | Trust | iota | Any | m | | 192.168.22 |
| 10022 | Black | kappa | 192.168.1.100 | jst | Show This Column | 192.168.22 |
| 20001 | Trust | sigma | 172.22.111.201 | can | Remove Column from Group... | 172.22.1 |
| 89109 | White | theta | 172.22.111.201 | w | Add Column to Group... | 192.168.12 |
| 60614 | Trust | alpha | Any | s | Resize Column | 192.168.22 |
| 20036 | Internet | kappa | 172.22.111.201 | tja | Column Settings... | 192.168.12 |
| 89145 | Trust | omega | Any | m | | 192.168.22 |
| 10010 | Trust | pi | 172.22.111.201 | tjo | | 172.22.12 |
| 60606 | White | zeta | 192.168.1.100 | jdavis | Untrust | 192.168.22 |
| 94301 | Trust | phi | 172.22.111.201 | mtaylor | Trust | 172.22.12 |
| 95101 | Trust | lambda | 172.22.111.201 | hmoore | Black | 192.168.22 |
| 94111 | Untrust | tau | Any | jwhite | Untrust | 172.22.1 |
| 89145 | Trust | alpha | 192.168.1.100 | mlee | White | 192.168.22 |
| 94111 | White | delta | 172.22.111.201 | aharris | Untrust | 192.168.22 |
| 95101 | Untrust | omega | Any | tjackson | Untrust | 172.22.1 |
| 10010 | Trust | delta | 192.168.1.100 | canderson | Black | 192.168.22 |
| 89109 | Untrust | alpha | 172.22.111.201 | mjones | Untrust | 192.168.22 |
| 60606 | Internet | gamma | 172.22.111.201 | tjohnson | Black | 172.22.1 |

FIG. 3D

| Date | Zone | Location | Source ID +3 | Desination Zone | Destination Address* | Type | Ela |
|---|---|---|---|---|---|---|---|
| 1/23/2016 | Yellow | 94111 | mjones | Black | 192.168.221.121 | sigma | 1 |
| 3/2/2017 | Gold | 10022 | jstevens | Trust | 192.168.221.111 | omega | 1 |
| 1/23/2016 | Blue | 20001 | canderson | Untrust | 172.22.1.101 | pi | 0 |
| 7/31/2016 | Green | 89109 | wilson | Black | 192.168.221.151 | zeta | 4 |
| 3/2/2017 | Gold | 60614 | smith | Untrust | 192.168.121.120 | lambda | 1 |
| 1/23/2016 | Red | 20036 | tjackson | Untrust | 192.168.121.122 | tau | 8 |
| 8/31/2016 | Red | 89145 | mjones | Trust | 192.168.121.231 | alpha | 7 |
| 5/31/2016 | Silver | 10010 | tjohnson | Untrust | 192.168.221.121 | delta | 1 |
| 1/23/2016 | Gold | 60606 | jdavis | Untrust | 172.22.121.101 | omega | 0 |
| 3/2/2017 | Black | 94301 | mtaylor | Trust | 192.168.221.121 | sigma | 0 |
| 1/23/2016 | Gold | 95101 | hmoore | Black | 192.168.221.121 | delta | 4 |
| 1/23/2016 | Orange | 94111 | jwhite | Untrust | 172.22.121.101 | gamma | 3 |
| 3/2/2017 | Blue | 89145 | mlee | White | 192.168.221.121 | beta | 0 |
| 5/31/2016 | Green | 94111 | aharris | Untrust | 192.168.221.121 | phi | 0 |
| 5/31/2016 | Gold | 95101 | tjackson | Black | 172.22.1.101 | delta | 9 |
| 8/31/2016 | Blue | 10010 | canderson | Untrust | 192.168.221.121 | alpha | 8 |
| 1/23/2016 | Gold | 89109 | mjones | Black | 192.168.221.121 | alpha | 2 |
| 3/2/2017 | Red | 60606 | tjohnson | Black | 172.22.1.151 | kappa | 3 |

FIG. 3E

| Date | Zone | Category | Type | Location | Source Zone +2 | Desination Zone +1 | Elapsed |
|---|---|---|---|---|---|---|---|
| 1/23/2016 | Yellow | iota | sigma | 94111 | Trust | Black | 13:23 |
| 3/2/2017 | Gold | kappa | omega | 10022 | Black | Trust | 12:03 |
| 1/23/2016 | Blue | sigma | pi | 20001 | Trust | Untrust | 0:00 |
| 7/31/2016 | Green | theta | zeta | 89109 | White | Black | 4:21 |
| 3/2/2017 | Gold | alpha | lambda | 60614 | Trust | Untrust | 17:32 |
| 1/23/2016 | Red | kappa | tau | 20036 | Internet | Untrust | 8:28 |
| 1/23/2016 | Red | omega | alpha | 89145 | Trust | Trust | 7:45 |
| 8/31/2016 | Silver | pi | delta | 10010 | Trust | Untrust | 1:23 |
| 5/31/2016 | Gold | zeta | omega | 60606 | White | Untrust | 0:27 |
| 1/23/2016 | Black | phi | sigma | 94301 | Trust | Trust | 0:52 |
| 3/2/2017 | Gold | lambda | delta | 95101 | Trust | Black | 4:59 |
| 1/23/2016 | Orange | tau | gamma | 94111 | Untrust | Untrust | 3:37 |
| 1/23/2016 | Blue | alpha | beta | 89145 | Trust | White | 0:21 |
| 3/2/2017 | Green | delta | phi | 94111 | White | Untrust | 0:22 |
| 5/31/2016 | Gold | omega | delta | 95101 | Untrust | Untrust | 9:44 |
| 5/31/2016 | Blue | delta | alpha | 10010 | Trust | Black | 8:19 |
| 8/31/2016 | Gold | alpha | alpha | 89109 | Untrust | Untrust | 2:59 |
| 1/23/2016 | Red | gamma | kappa | 60606 | Internet | Black | 3:00 |
| 3/2/2017 | Silver | beta | gamma | 10022 | Untrust | White | 6:12 |

FIG. 4B

| WINDOW | | | | | | |
|---|---|---|---|---|---|---|
| Date | Zone | Category | Location | Source Zone +2 | Desination Zone +1 | Type | Elapsed |
| 1/23/2016 | Yellow | Group Selected Columns ... ←571 | | Trust | Black | sigma | 13:23 |
| 3/2/2017 | Gold | Column Settings ... | | Black | Trust | omega | 12:03 |
| 1/23/2016 | Blue | Delete Columns ... | | Trust | Untrust | pi | 0:00 |
| 7/31/2016 | Green | Grid Settings ... 570 | | White | Black | zeta | 4:21 |
| 3/2/2017 | Gold | | | Trust | Untrust | lambda | 17:32 |
| 1/23/2016 | Red | | | Internet | Untrust | tau | 8:28 |
| 8/31/2016 | Red | pi | 10010 | Trust | Trust | alpha | 7:45 |
| 5/31/2016 | Silver | zeta | 60606 | Trust | Untrust | delta | 1:23 |
| 1/23/2016 | Gold | phi | 94301 | White | Untrust | omega | 0:27 |
| 3/2/2017 | Black | lambda | 95101 | Trust | Trust | sigma | 0:52 |
| 1/23/2016 | Gold | tau | 94111 | Untrust | Black | delta | 4:59 |
| 1/23/2016 | Orange | alpha | 89145 | Trust | Untrust | gamma | 3:37 |
| 3/2/2017 | Blue | delta | 94111 | White | White | beta | 0:21 |
| 5/31/2016 | Green | omega | 95101 | Untrust | Untrust | phi | 0:22 |
| 5/31/2016 | Gold | delta | 10010 | Trust | Black | delta | 9:44 |
| 8/31/2016 | Blue | alpha | 89109 | Untrust | Untrust | alpha | 8:19 |
| 1/23/2016 | Gold | gamma | 60606 | Internet | Black | alpha | 2:59 |
| 3/2/2017 | Red | beta | 10022 | Untrust | White | kappa | 3:00 |
| 3/2/2017 | Silver | | | | | gamma | 6:12 |

FIG. 5A

| Date | Zone +1 | Category | Location | Source Zone +2 | Desination Zone +1 | Elapsed |
|---|---|---|---|---|---|---|
| 1/23/2016 | Yellow | iota | 94111 | Trust | Black | 13:23 |
| 3/2/2017 | Gold | kappa | 10022 | Black | Trust | 12:03 |
| 1/23/2016 | Blue | sigma | 20001 | Trust | Untrust | 0:00 |
| 7/31/2016 | Green | theta | 89109 | White | Black | 4:21 |
| 3/2/2017 | Gold | alpha | 60614 | Trust | Untrust | 17:32 |
| 1/23/2016 | Red | kappa | 20036 | Internet | Untrust | 8:28 |
| 8/31/2016 | Red | omega | 89145 | Trust | Trust | 7:45 |
| 5/31/2016 | Silver | pi | 10010 | Trust | Untrust | 1:23 |
| 1/23/2016 | Gold | zeta | 60606 | White | Untrust | 0:27 |
| 3/2/2017 | Black | phi | 94301 | Trust | Trust | 0:52 |
| 1/23/2016 | Gold | lambda | 95101 | Trust | Black | 4:59 |
| 1/23/2016 | Orange | tau | 94111 | Untrust | Untrust | 3:37 |
| 3/2/2017 | Blue | alpha | 89145 | Trust | White | 0:21 |
| 5/31/2016 | Green | delta | 94111 | White | Untrust | 0:22 |
| 5/31/2016 | Gold | omega | 95101 | Untrust | Untrust | 9:44 |
| 8/31/2016 | Blue | delta | 10010 | Trust | Black | 8:19 |
| 1/23/2016 | Gold | alpha | 89109 | Untrust | Untrust | 2:59 |
| 3/2/2017 | Red | gamma | 60606 | Internet | Black | 3:00 |
| 3/2/2017 | Silver | beta | 10022 | Untrust | White | 6:12 |

FIG. 5B

| Date | Zone | Type | Category | Location | Source Zone +2 | Desination Zone +1 | Elapsed |
|---|---|---|---|---|---|---|---|
| 1/23/2016 | Yellow | sigma | iota | 94111 | Trust | Black | 13:23 |
| 3/2/2017 | Gold | omega | kappa | 10022 | Black | Trust | 12:03 |
| 1/23/2016 | Blue | pi | sigma | 20001 | Trust | Untrust | 0:00 |
| 7/31/2016 | Green | zeta | theta | 89109 | White | Black | 4:21 |
| 3/2/2017 | Gold | lambda | alpha | 60614 | Trust | Untrust | 17:32 |
| 1/23/2016 | Red | tau | kappa | 20036 | Internet | Untrust | 8:28 |
| 8/31/2016 | Red | alpha | omega | 89145 | Trust | Trust | 7:45 |
| 5/31/2016 | Silver | delta | pi | 10010 | Trust | Untrust | 1:23 |
| 1/23/2016 | Gold | omega | zeta | 60606 | White | Untrust | 0:27 |
| 3/2/2017 | Black | sigma | phi | 94301 | Trust | Trust | 0:52 |
| 1/23/2016 | Gold | delta | lambda | 95101 | Trust | Black | 4:59 |
| 1/23/2016 | Orange | gamma | tau | 94111 | Untrust | Untrust | 3:37 |
| 3/2/2017 | Blue | beta | alpha | 89145 | Trust | White | 0:21 |
| 5/31/2016 | Green | phi | delta | 94111 | White | Untrust | 0:22 |
| 5/31/2016 | Gold | delta | omega | 95101 | Untrust | Untrust | 9:44 |
| 8/31/2016 | Blue | alpha | delta | 10010 | Trust | Black | 8:19 |
| 1/23/2016 | Gold | alpha | alpha | 89109 | Untrust | Untrust | 2:59 |
| 3/2/2017 | Red | kappa | gamma | 60606 | Internet | Black | 3:00 |
| 3/2/2017 | Silver | gamma | beta | 10022 | Untrust | White | 6:12 |

FIG. 5C

| WINDOW | | | | | | |
|---|---|---|---|---|---|---|
| Date | Zone +1 | Category | Location | Source Zone +2 | Desination Zone +1 | Elapsed |
| 1/23/2016 | Yellow | iota | 94111 | Trust | Black | 13:23 |
| 3/2/2017 | Gold | kappa | 10022 | Black | Trust | 12:03 |
| 1/23/2016 | Blue | sigma | 20001 | Trust | Untrust | 0:00 |
| 7/31/2016 | Green | theta | 89109 | White | Black | 4:21 |
| 3/2/2017 | Gold | alpha | 60614 | Trust | Untrust | 17:32 |
| 1/23/2016 | Red | kappa | 20036 | Internet | Untrust | 8:28 |
| 8/31/2016 | Red | omega | 89145 | Trust | Trust | 7:45 |
| 5/31/2016 | Silver | pi | 10010 | Trust | Untrust | 1:23 |
| 1/23/2016 | Gold | zeta | 60606 | White | Trust | 0:27 |
| 3/2/2017 | Black | phi | 94301 | Trust | Black | 0:52 |
| 1/23/2016 | Gold | lambda | 95101 | Trust | Untrust | 4:59 |
| 1/23/2016 | Orange | tau | 94111 | Untrust | Untrust | 3:37 |
| 3/2/2017 | Blue | alpha | 89145 | Trust | White | 0:21 |
| 5/31/2016 | Green | delta | 94111 | White | Untrust | 0:22 |
| 5/31/2016 | Gold | omega | 95101 | Untrust | Untrust | 9:44 |
| 8/31/2016 | Blue | delta | 10010 | Trust | Black | 8:19 |

FIG. 6A

| WINDOW | | | | | | | |
|---|---|---|---|---|---|---|---|
| Date | Zone | Type | Category | Location | Source Zone +2 | Desination Zone +1 | Elapsed |
| 1/23/2016 | Yellow | sigma | iota | 94111 | Trust | Black | 13:23 |
| 3/2/2017 | Gold | omega | kappa | 10022 | Black | Trust | 12:03 |
| 1/23/2016 | Blue | pi | sigma | 20001 | Trust | Untrust | 0:00 |
| 7/31/2016 | Green | zeta | theta | 89109 | White | Black | 4:21 |
| 3/2/2017 | Gold | lambda | alpha | 60614 | Trust | Untrust | 17:32 |
| 1/23/2016 | Red | tau | kappa | 20036 | Internet | Untrust | 8:28 |
| 8/31/2016 | Red | alpha | omega | 89145 | Trust | Trust | 7:45 |
| 5/31/2016 | Silver | delta | pi | 10010 | Trust | Untrust | 1:23 |
| 1/23/2016 | Gold | omega | zeta | 60606 | White | Trust | 0:27 |
| 3/2/2017 | Black | sigma | phi | 94301 | Trust | Trust | 0:52 |
| 1/23/2016 | Gold | delta | lambda | 95101 | Trust | Black | 4:59 |
| 1/23/2016 | Orange | gamma | tau | 94111 | Untrust | Untrust | 3:37 |
| 3/2/2017 | Blue | beta | alpha | 89145 | Trust | White | 0:21 |
| 5/31/2016 | Green | phi | delta | 94111 | White | Untrust | 0:22 |
| 5/31/2016 | Gold | delta | omega | 95101 | Untrust | Untrust | 9:44 |
| 8/31/2016 | Blue | alpha | delta | 10010 | Trust | Black | 8:19 |
| 1/23/2016 | Gold | alpha | alpha | 89109 | Untrust | Untrust | 2:59 |
| 3/2/2017 | Red | kappa | gamma | 60606 | Internet | Black | 3:00 |
| 3/2/2017 | Silver | gamma | beta | 10022 | Untrust | White | 6:12 |

FIG. 6B

| Date | Zone +1 | Categ. +1 | Source Zone +2 | Desination Zone +1 | Elapsed |
|---|---|---|---|---|---|
| 1/23/2016 | Yellow | iota | Trust | Black | 13:23 |
| 3/2/2017 | Gold | kappa | Black | Trust | 12:03 |
| 1/23/2016 | Blue | sigma | Trust | Untrust | 0:00 |
| 7/31/2016 | Green | theta | White | Black | 4:21 |
| 3/2/2017 | Gold | alpha | Trust | Untrust | 17:32 |
| 1/23/2016 | Red | kappa | Internet | Untrust | 8:28 |
| 8/31/2016 | Red | omega | Trust | Trust | 7:45 |
| 5/31/2016 | Silver | pi | Trust | Untrust | 1:23 |
| 1/23/2016 | Gold | zeta | White | Untrust | 0:27 |
| 3/2/2017 | Black | phi | Trust | Trust | 0:52 |
| 1/23/2016 | Gold | lambda | Trust | Black | 4:59 |
| 1/23/2016 | Orange | tau | Untrust | Untrust | 3:37 |
| 3/2/2017 | Blue | alpha | Trust | White | 0:21 |
| 5/31/2016 | Green | delta | White | Untrust | 0:22 |
| 5/31/2016 | Gold | omega | Untrust | Untrust | 9:44 |
| 8/31/2016 | Blue | delta | Trust | Black | 8:19 |

FIG. 6C

COMPUTING DEVICE USER INTERFACE HAVING AUTO-GROUPING OF DATA COLUMNS

TECHNICAL FIELD

This disclosure relates to computing devices and, in particular, user interfaces for displaying tabular data on computing devices.

BACKGROUND

Computing devices often present tabular data in a grid-based user interface having rows and columns. In some cases, such a user interface includes a vertical scroll bar, and the computing device responds to interactions with the vertical scroll bar by changing the subset of rows displayed within the user interface. Similarly, such a user interface often includes a horizontal scroll bar, and the computing device responds to interactions with the horizontal scroll bar by changing the subset of columns displayed within the user interface. Some users find that using scroll bars, particularly horizontal scroll bars, is both awkward and inefficient.

SUMMARY

This disclosure describes techniques for intelligently grouping, ungrouping, collapsing, and/or expanding columns of data for effective presentation on a display screen. Techniques in accordance with one or more aspects of the present disclosure enable presentation of data without the need, or with a reduction in the need, for a horizontal scroll bar. As described, the techniques may involve a computing device automatically processing tabular data to identify groups of one or more sets of columns, and as needed or desirable, displaying data by presenting one or more of those groups of columns as a single visible column with the remaining columns being automatically hidden yet accessible to the user if desired.

In at least some applications of such a technique, a user interface in which two or more columns of data are automatically presented on the user interface as a grouped single column may consume less horizontal space on a display screen or within a window or other display element on the display screen. Accordingly, such a user interface may represent each column of data either as a visible column or as a hidden column within a grouped column of the user interface. In some examples, a user interface that includes grouped columns will more effectively fit within a window or other display element on a display screen when another user interface that does not include grouped columns will not. Accordingly, in some examples, presentation of grouped columns may obviate the need for the computing device to render a horizontal scroll bar, and may reduce computing resources necessary to manipulate the user interface in response to user interaction with the horizontal scroll bar. Further, by more efficiently presenting data, the computing device may perform less computing operations processing input associated with horizontal scrolling operations where horizontal scrolling is unnecessary.

A computing device employing techniques described herein may also responsively modify the user interface in response to user input. For instance, user input resizing a window that presents columns of data may prompt adjustments to the presentation of grouped columns. Further, such a computing device may also modify the user interface in response to user input requesting that grouped columns be expanded into individual columns, or requesting that individual columns be collapsed into grouped columns. A computing device in accordance with one or more aspects of the present disclosure may also create, modify, or otherwise adjust groupings of columns in response to user input.

The details of one or more examples of the disclosure are set forth in the accompanying drawings and the description below. Other features, objects, and advantages of the disclosure will be apparent from the description and drawings, and from the claims

BRIEF DESCRIPTION OF THE DRAWINGS

FIG. 3A, FIG. 3B, FIG. 3C, FIG. 3D, and FIG. 3E are conceptual diagrams illustrating example user interfaces presented by an example computing device in accordance with one or more aspects of the present disclosure.

FIG. 4A and FIG. 4B are conceptual diagrams illustrating example user interfaces corresponding to an alternate column grouping scenario performed by an example computing device, in accordance with one or more aspects of the present disclosure.

FIG. 5A, FIG. 5B, and FIG. 5C are conceptual diagrams illustrating example user interfaces corresponding to a grouping scenario performed by an example computing device in response to user input, in accordance with one or more aspects of the present disclosure.

FIG. 6A, FIG. 6B, and FIG. 6C are conceptual diagrams illustrating example user interfaces illustrating changes to user interfaces in response to resizing operations, in accordance with one or more aspects of the present disclosure.

DETAILED DESCRIPTION

Figure 1:
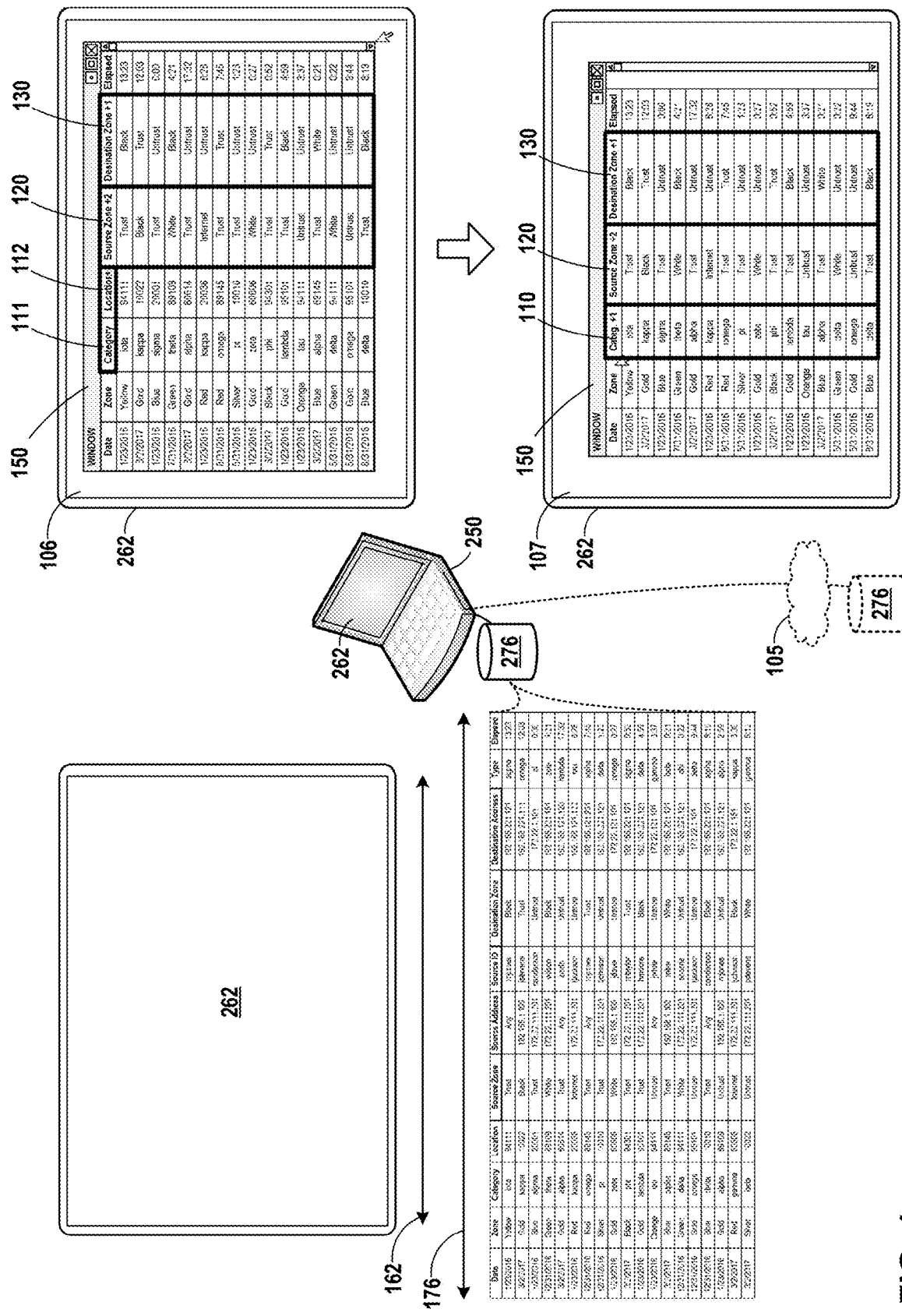
FIG. 1 is a conceptual diagram illustrating an example computing device that is configured to present data by intelligently grouping and ungrouping columns for effective presentation on a display screen, in accordance with one or more aspects of the present disclosure.

FIG. 1 is a conceptual diagram illustrating an example computing device 250 that is configured to present data by intelligently grouping and ungrouping columns for effective presentation on a display screen, in accordance with one or more aspects of the present disclosure. FIG. 1 illustrates one example implementation of such a system. Other implementations may be appropriate in other instances. In the example of FIG. 1, computing device 250 includes display 262 and data 276. In the example shown, display 262 is integrated within computing device 250. Further, in the example of FIG. 1, data 276 is accessible by computing device 250, and may be local to computing device 250 or integrated within computing device 250. As illustrated in FIG. 1, data 276 may correspond to or include tabular data that may be presented in a grid-based form.

Although for convenience, data 276 may be described herein as being local to computing device 250, in other examples, data 276 might not be local to computing device 250, and may alternatively be accessible through optional network 105. In such an example, data 276 may take the form of a remotely located data store administered by one or more other computing devices on the network.

In the example of FIG. 1, computing device 250 may be implemented as any suitable computing system, such as a mobile, non-mobile, wearable, and/or non-wearable computing device. Computing device 250 may represent a computing device that performs operations described herein as the result of instructions, stored on a computer-readable storage medium, executing on one or more processors. The instructions may be in the form of software stored on one or more local or remote computer readable storage devices. In other examples, computing device 250 may perform operations using hardware, firmware, or a mixture of hardware, software, and firmware residing in and/or executing at computing device 250.

Computing device 250 may represent a smart phone, a tablet computer, a computerized watch, a computerized glove or gloves, a personal digital assistant, a virtual assistant, a gaming system, a media player, an e-book reader, a television or television platform, a bicycle, automobile, or navigation, information and/or entertainment system for a bicycle, automobile or other vehicle, a laptop or notebook computer, a desktop computer, or any other type of wearable, non-wearable, mobile, or non-mobile computing device that may perform operations in accordance with one or more aspects of the present disclosure.

Further, although computing device 250 may be a stand-alone device, computing device 250 may be implemented in any of a wide variety of ways. For example, computing device 250 may be implemented through multiple devices and/or systems. In another example, computing device 250 may be, or may be part of, any component, device, or system that includes a processor or other suitable computing environment for processing information or executing software instructions.

Computing device 250 may serve as a computing device that enables a user to interact with, browse, and/or use information or resources available over a network (e.g., network 105). For instance, computing device 250 may, at the direction of a user, browse for information, communicate with others, perform calculations, analyze data, monitor or check or process a user's personal communications, control other devices, perform a physical task or cause one to be performed, access other information or resources, and display tabular data for analysis by a user. Computing device 250 may pair with and/or communicate with other devices, and may send control signals to other devices or systems.

Although functions and operations described in connection with FIG. 1 may be illustrated or described as being performed by computing device 250, in other examples, the features and techniques attributed to one or more devices in FIG. 1 may be distributed across multiple devices. In particular, some or all of the operations attributed in the description herein to computing device 250 may be performed, in other examples, by one or more remote or cloud-based computing devices (e.g., by a remote data store operating on remotely-stored data 276). In such an example, computing device 250 may be thin client device that presents a user interface that is partially or fully generated by a remote system. Further, certain operations, techniques, features, and/or functions may be described in connection with FIG. 1 or in connection with other illustrations herein as performed by specific components, devices, and/or modules. In other examples, such operations, techniques, features, and/or functions may be performed by other components, devices, or modules. Accordingly, some operations, techniques, features, and/or functions attributed to one or more components, devices, or modules may be attributed to other components, devices, and/or modules, even if not specifically described herein in such a manner.

In the example of FIG. 1, computing device 250 may respond to user input requesting that data 276 be displayed on display 262. For instance, in FIG. 1, computing device 250 detects input that it determines corresponds to a request to present information from data 276 on display 262. Computing device 250, in response to such input, accesses data 276. Computing device 250 determines that data 276 is structured, or is susceptible to being structured, in a tabular format having a plurality of columns. Computing device 250 determines the size of display 262 and identifies various display parameters for displaying data 276 on display 262 (e.g., an appropriate font and font size, columns widths, size of window or other display element in which data 276 will be presented). In some examples, computing device 250 may further determine that if data 276 is presented in a tabular format on display 262 with the identified display parameters, data 276 will be too wide to fit within the display area available on display 262.

Accordingly, computing device 250 may determine that data 276 can be presented on display 262 through a user interface that includes a horizontal scroll bar. In examples where a scroll bar is used, computing device 250 may respond to user interactions with the horizontal scroll bar by displaying sections (e.g., contiguous groups of adjacent columns) of data 276. In this way, computing device 250 presents a subset of the columns of data 276, as chosen by the user through interactions with the horizontal scroll bar. However, some users prefer to avoid viewing, browsing, and/or interacting with data or other information through a user interface that has a horizontal scroll bar. For instance, some users find interactions with a user interface inconvenient, tedious, or unproductive.

Accordingly, in the example of FIG. 1, and in accordance with one or more aspects of the present disclosure, computing device 250 may analyze data 276, and group one or more columns of data 276 so that data 276 may be presented on display 262 in a user interface that does not have a horizontal scroll bar. For instance, in the example of FIG. 1, computing device 250 analyzes data 276 to identify columns of data 276 that may be combined into one or more groups. In some examples, computing device 250 identifies a column name, a data type, and/or other metadata associated with columns of data 276. The column name could be a header included in the data itself, or may be included within metadata associated with data 276. Data types may be explicitly specified in data 276, or computing device 250 may infer data types based on an analysis of the data 276. Further, metadata could be included within data 276, or may be referenced by data 276 or may be otherwise available to computing device 250 when accessing data 276. Computing device 250 identifies, based on a common characteristic or based on other attributes, columns that could or should be included within one or more groups. Computing device 250 may identify one or more columns that have a common name, a common term, and/or a common subject or topic. Alternatively, or in addition, computing device 250 may identify one or more columns that have similar or related data, or similar or related data types. Alternatively, or in addition, computing device 250 may identify one or more columns that may be related in some other way. Computing device 250 determines how many and/or which columns should be grouped in order to present data 276 in a user interface that does not have a horizontal scroll bar, generates user interface 106, and presents it at display 262.

In the example of FIG. 1, user interface 106 includes window 150 in which data 276 is presented. In window 150, two sets of columns are each presented as a group. For instance, to represent the first group of columns, grouped column 120 is presented within window 150 of user interface 106. Grouped column 120 is presented with a bold outline to indicate that grouped column 120 represents multiple columns. To represent the second group of columns, grouped column 130 is presented within window 150 of user interface 106. Like grouped column 120, grouped column 130 is presented within user interface 106 with a bold outline to indicate that grouped column 130 represents multiple columns. In the example of FIG. 1, computing device 250 has also identified column 111 and column 112 as belonging to a third group of columns. However, computing device 250 has not presented column 111 and column 112 as a single column in user interface 106, because when grouped column 120 and grouped column 130 are presented within user interface 106, computing device 250 is able to fit (i.e., without use of a scroll bar) the remaining columns of data 276 within window 150 without presenting column 111 and column 112 as a single grouped column. Accordingly, computing device 250 has determined that presenting column 111 and column 112 as a single column is not necessary to avoid use of a horizontal scroll bar.

After computing device 250 presents user interface 106, computing device 250 detects input that it determines corresponds to a request, by a user, to make window 150 within user interface 106 smaller. In response, computing device 250 generates user interface 107 and presents user interface 107 on display 262 as illustrated in FIG. 1. In the example shown, user interface 107 includes a smaller window 150, relative to window 150 presented within user interface 106. In generating user interface 107, computing device 250 determines, based on the new, smaller window 150, that in order to present data 276 within window 150 without a scroll bar, column 111 and column 112 should be presented as a single grouped column 110. Accordingly, as illustrated in FIG. 1, user interface 107 includes grouped column 110, grouped column 120, and grouped column 130.

Computing device 250 may thereafter respond to input that computing device 250 determines corresponds to a request to make window 150 larger on display 262. In such an example, computing device 250 may also determine that one or more of grouped column 110, grouped column 120, and/or grouped column 130 can be expanded while still representing data 276 within window 150 without use of a scroll bar, and computing device 250 may therefore adjust which column groups are expanded or collapsed when presented on display 262. Accordingly, computing device 250 may collapse related columns of data 276 so that each column of data 276 can be presented within a user interface, where each set of collapsed related columns is represented by a single column. Correspondingly, computing device 250 may expand (or "ungroup") related columns of data 276 where a user interface is resized or otherwise presented in a larger region of display 262. In this way, computing device 250 may be responsive to user input and/or changes in user interface or display size, and combine columns as needed to fit within a window or other user interface element presented on display 262, and ungroup columns when possible in response to increases in display size, window or display element changes, data changes, and/or other conditions.

Although examples herein are described in terms of responsively and/or intelligently grouping, ungrouping, expanding, and/or collapsing columns of data for effective, convenient, and/or efficient presentation on a display screen, it should be understood that the same or similar techniques may be applied to rows of data. For instance, in some examples, rows of data that share common data in one or more columns may be grouped together as a single row. In other examples, rows of data that share similar data or common types of data in one or more columns may be grouped together as a single row. Such grouped rows may be responsively expanded and collapsed as necessary to avoid use of a vertical scroll bar as changes in display size, window or display element changes, data changes, and/or other conditions are detected.

By intelligently grouping and ungrouping data for effective presentation on a display screen, computing device 250 may present data more efficiently, and avoid requiring the user to perform scrolling operations. Accordingly, as a result of presenting data more efficiently, and avoiding scrolling (e.g., horizontal scrolling) operations, computing device 250 may enable users to more efficiently and quickly analyze data. By more efficiently presenting data, computing device 250 may perform less computing operations processing input associated with horizontal scrolling operations where horizontal scrolling is unnecessary. By performing less computing operations processing input, computing device 250 may perform less computing operations in general, and thereby consume less electrical power. Further, by enabling users to more efficiently and quickly analyze data, computing device 250 may spend less time presenting data, since the user may need less time to complete any desired analysis of the data. Accordingly, by spending less time presenting data, computing device 250 might not consume electrical power that would otherwise be expended presenting data. Therefore, aspects of this disclosure may improve the function of computing device 250 because presenting data more efficiently (e.g., by avoiding horizontal scrolling) may have the effect of consuming less electrical power.

Figure 2:
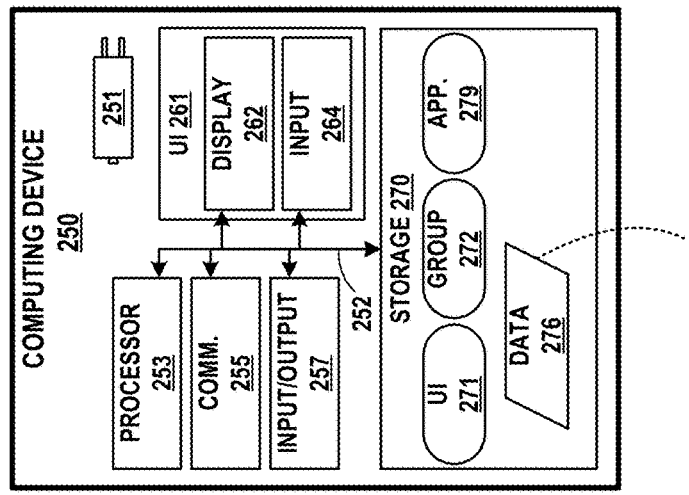
FIG. 2 is a block diagram illustrating an example computing device configured to present data by intelligently grouping and ungrouping columns for effective presentation on a display screen, in accordance with one or more aspects of the present disclosure.

FIG. 2 is a block diagram illustrating an example computing device configured to present data by intelligently grouping and ungrouping columns for effective presentation on a display screen, in accordance with one or more aspects of the present disclosure. Computing device 250 of FIG. 2 may be described as an example or alternate implementation of computing device 250 of FIG. 1. One or more aspects of FIG. 2 may be described herein within the context of computing device 250 of FIG. 1. FIG. 2 illustrates one example or alternate implementation of computing device 250. Other example or alternate implementations of computing device 250 may be appropriate in other instances. Such implementations may include a subset of the devices and/or components included in the example of FIG. 2 and/or may include additional devices and/or components not shown in FIG. 2.

Although computing device 250 may be described herein as a computing device operating on locally-stored data 276, as described in FIG. 1, some alternative implementations may involve much of the logic and/or operations attributed herein to computing device 250 being performed by a cloud-based computing device. In such an example, computing device 250 may access a cloud-based system that accesses a remotely-stored data 276 and generates one or more user interfaces that computing device 250 presents locally.

Accordingly, computing device 250 may be implemented in a number of different ways. In some examples, one or more devices of computing device 250 that are illustrated as separate devices may be implemented as a single device; one or more components of computing device 250 that are illustrated as separate components may be implemented as a single component. Also, in some examples, one or more devices of computing device 250 that are illustrated as a single device may be implemented as multiple devices; one or more components of computing device 250 that are illustrated as a single component may be implemented as multiple components. Each of the multiple devices may directly coupled via wired or wireless communication and/or remotely coupled via one or more networks. Further, one or more devices or components of computing device 250 that are illustrated in FIG. 2 may be implemented as part of another device or component not shown in FIG. 2. In this manner, some of the functions describe herein may be performed via distributed processing by two or more devices.

In the example of FIG. 2, computing device 250 includes power source 251, one or more processors 253, one or more communication units 255, one or more input/output devices 257, user interface device 261, and one or more storage devices 270. User interface device 261 includes one or more displays 262 and one or more input devices 264. Storage devices 270 may include user interface module 271, grouping module 272, application modules 279, and data 276. One or more of the devices, modules, storage areas, or other components of computing device 250 may be interconnected to enable inter-component communications (physically, communicatively, and/or operatively). In some examples, such connectivity may be provided through communication channels (e.g., communication channels 252), a system bus, a network connection, an inter-process communication data structure, or any other method for communicating data.

Power source 251 provides power to one or more components of computing device 250 in the example of FIG. 2. Power source 251 may receive power from the primary alternative current (AC) power supply in a building, home, or other location. In other examples, power source 251 may be a battery. In still further examples, computing device 250 and/or power source 251 may receive power from another source. One or more of the devices or components illustrated within computing device 250 may be connected to power source 251, and/or may receive power from power source 251. Power source 251 may have intelligent power management or consumption capabilities, and such features may be controlled, accessed, or adjusted by one or more modules of computing device 250 and/or by one or more processors 253 to intelligently consume, allocate, supply, or otherwise manage power.

One or more processors 253 of computing device 250 implement functionality and/or execute instructions associated with computing device 250 or associated with one or more modules illustrated herein and/or described below. One or more processors 253 may be, may be part of, and/or may include processing circuitry that performs operations in accordance with one or more aspects of the present disclosure. Examples of processors 253 include microprocessors, application processors, display controllers, auxiliary processors, one or more sensor hubs, and any other hardware configured to function as a processor, a processing unit, or a processing device. Computing device 250 may use one or more processors 253 to perform operations in accordance with one or more aspects of the present disclosure using software, hardware, firmware, or a mixture of hardware, software, and firmware residing in and/or executing at computing device 250.

One or more communication units 255 of computing device 250 may communicate with devices external to computing device 250 by transmitting and/or receiving data, and may operate, in some respects, as both an input device and an output device. In some examples, communication unit 255 may communicate with other devices over a network. In other examples, communication units 255 may send and/or receive radio signals on a radio network such as a cellular radio network. In other examples, communication units 255 of computing device 250 may transmit and/or receive satellite signals on a satellite network such as a Global Positioning System (GPS) network. Examples of communication units 255 include a network interface card (e.g. such as an Ethernet card), an optical transceiver, a radio frequency transceiver, a GPS receiver, or any other type of device that can send and/or receive information. Other examples of communication units 255 may include devices capable of communicating over Bluetooth®, GPS, NFC, ZigBee, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth, NFC, or other technologies or protocols.

One or more input/output devices 257 represent any input or output devices of computing device 250 not otherwise separately described herein. One or more input/output devices 257 may generate, receive, and/or process input from any type of device capable of detecting input from a human or machine. For example, one or more input/output devices 257 may generate, receive, and/or process input in the form of physical, audio, image, and/or visual input (e.g., keyboard, microphone, camera). One or more input/output devices 257 may generate, present, and/or process output through any type of device capable of producing output. For example, one or more input/output devices 257 may generate, present, and/or process output in the form of tactile, audio, visual, and/or video output (e.g., haptic response, sound, flash of light, and/or images). Some devices may serve as input devices, some devices may serve as output devices, and some devices may serve as both input and output devices.

User interface device 261 functions as an input and/or output device or set of input/output devices for computing device 250 in the example of FIG. 2, and may be implemented using various devices, components, and/or technologies. User interface device 261 may include presence-sensitive input panel technologies, microphone technologies, voice activation and/or recognition technologies, cameras, sensor technologies (e.g., infrared, image, location, motion, accelerometer, gyrometer, magnetometer), or other input device technology for use in receiving user input; user interface device 261 may include display devices, speaker technologies, haptic feedback technologies, tactile feedback technologies, light emitting technologies, or other output device technologies for use in outputting information to a user.

In the example of FIG. 2, user interface device 261 includes one or more displays 262 and one or more input devices 264. Although certain components associated with computing device 250 are described or illustrated in FIG. 2 as being implemented within user interface device 261, in other examples, such components could be implemented external to user interface device 261, and other components could be implemented within user interface device 261. Further, while illustrated as an internal component of computing device 250, user interface device 261 may also represent an external or partially external component that shares a data path with computing device 250 for transmitting and/or receiving input and output. For instance, in some examples, user interface device 261 represents a built-in component of computing device 250 located within and physically connected to the external packaging of computing device 250 (e.g., a screen on a mobile phone). In other examples, user interface device 261 represents an external component of computing device 250 located outside and physically separated from the packaging or housing of computing device 250 (e.g., a monitor, a projector, etc. that shares a wired and/or wireless data path with computing device 250). In still other examples, one or more components of user interface device 261 may be built-in components of computing device 250, and one or more components of user interface device 261 may be external components of computing device 250 (e.g., some components of user interface device 261 may be internal, and others may be external). Further, one or more components of user interface device 261 may be integrated together, so that one component is or appears to be a built-in component of another. For example, a display device and a presence-sensitive panel may be used together to implement a touch-screen display.

One or more displays 262 in the example of FIG. 2 represent any appropriate type of display device, such as a display associated with any type of computing device, such as a desktop computer, laptop computer, tablet, mobile phone, watch, or any other type of wearable, non-wearable, mobile, or non-mobile computing device. Display 262 may function as one or more output (e.g., display) devices using technologies including liquid crystal displays (LCD), dot matrix displays, light emitting diode (LED) displays, organic light-emitting diode (OLED) displays, e-ink, or similar monochrome or color displays capable of generating tactile, audio, and/or visual output. Display 262 may include a cathode ray tube (CRT) monitor, liquid crystal display (LCD), Light-Emitting Diode (LED) display, or any other type of display device. Display 262 may be a television screen in a private home or other location. Display 262 may also be a large screen in a movie theatre or cinema, or in any other location. Display 262 may include a projector for displaying images on a viewing surface, such as that sometimes used for a slide show presentation. In some examples, displays 262 may include a main display associated with a computing device (e.g., a laptop or desktop computer display), and also an auxiliary display. In such an example, and in some instances, while visual information is presented on a main display, the same, similar, or different visual information is presented on an auxiliary display.

Display 262 may output information to a user in the form of a user interface (e.g., as shown in FIG. 1), which may be associated with functionality provided by computing device 250. Such user interfaces may be associated with computing platforms, operating systems, applications, and/or services executing at or accessible from computing device 250 (e.g., network monitoring applications, spreadsheet, database, or data analysis and/or visualization applications, electronic message applications, chat applications, Internet browser applications, mobile or desktop operating systems, social media applications, electronic games, and other types of applications). For example, display 262 may present one or more user interfaces which are graphical user interfaces of an application executing at computing device 250 including various graphical elements displayed at various locations of display 262.

One or more input devices 264 in the example of FIG. 2 represent any output devices of computing device 250 not otherwise separately described herein. Input devices 264 may generate, present, and/or process output. For example, one or more input devices 264 may generate, present, and/or process output in the form of tactile, audio, visual, and/or video output. Input devices 264 may include a pointing device (e.g., a mouse), trackpad, keyboard, a sound card, video graphics adapter card, speaker, presence-sensitive screen, one or more USB interfaces, video and/or audio output interfaces, or any other type of device capable of generating tactile, audio, visual, video, or other output (e.g., a haptic response, a sound, a flash of light, and/or images).

One or more storage devices 270 within computing device 250 may store information for processing during operation of computing device 250. Storage devices 270 may store program instructions and/or data associated with one or more of the modules described in accordance with one or more aspects of this disclosure. One or more processors 253 and one or more storage devices 270 may provide an operating environment or platform for such modules, which may be implemented as software, but may in some examples include any combination of hardware, firmware, and software. One or more processors 253 may execute instructions and one or more storage devices 270 may store instructions and/or data of one or more modules. The combination of processors 253 and storage devices 270 may retrieve, store, and/or execute the instructions and/or data of one or more applications, modules, or software. Processors 253 and/or storage devices 270 may also be operably coupled to one or more other software and/or hardware components, including, but not limited to, one or more of the components of computing device 250 and/or one or more devices or systems illustrated as being connected to computing device 250.

In some examples, one or more storage devices 270 are temporary memories, meaning that a primary purpose of the one or more storage devices is not long-term storage. Storage devices 270 of computing device 250 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Storage devices 270, in some examples, also include one or more computer-readable storage media. Storage devices 270 may be configured to store larger amounts of information than volatile memory. Storage devices 270 may further be configured for long-term storage of information as non-volatile memory space and retain information after activate/off cycles. Examples of non-volatile memories include magnetic hard disks, optical discs, floppy disks, Flash memories, or forms of electrically programmable memories (EPROM) or electrically erasable and programmable (EEPROM) memories.

User interface module 271 in the example of FIG. 2 manages user interactions with user interface device 261 and other components of computing device 250. User interface module 271 may cause user interface device 261 to output various user interfaces for display or presentation or otherwise, as a user of computing device 250 views, hears, or otherwise senses output and/or provides input at user interface device 261. User interface device 261 may detect input, and may output to user interface module 271 one or more indications of input as a user of computing device 250 interacts with a user interface presented at user interface device 261. User interface module 271 and user interface device 261 may interpret inputs detected at user interface device 261 and may relay information about the inputs detected at user interface device 261 to one or more associated platforms, operating systems, applications, and/or services executing at computing device 250 to cause computing device 250 to perform one or more functions.

User interface module 271 may receive information and instructions from a platform, operating system, application, and/or service executing at computing device 250 and/or one or more remote computing systems. In addition, user interface module 271 may act as an intermediary between a platform, operating system, application, and/or service executing at computing device 250 and various output devices of computing device 250 (e.g., speakers, LED indicators, audio or electrostatic haptic output devices, light emitting technologies, displays, etc.) to produce output (e.g., a graphic, a flash of light, a sound, a haptic response, etc.).

User interface module 271 may perform operations described using software, hardware, firmware, or a mixture of hardware, software, and firmware residing in and/or executing at computing device 250. Computing device 250 may execute user interface module 271 with multiple processors or multiple devices, as a virtual machine executing on underlying hardware, as one or more services of an operating system or computing platform, and/or as one or more executable programs at an application layer of a computing platform.

Grouping module 272 performs operations relating to grouping, ungrouping, and presenting columns of data 276 as described herein in accordance with one or more aspects of the present disclosure. In some examples, grouping module 272 automatically identifies columns that may be automatically grouped together and presented as a single column. In other examples, grouping module 272 may respond to user input that identifies columns that could or should be part of a column group. Grouping module 272 may generate user interfaces that implement groupings of columns. Grouping module 272 may respond to user input expanding and/or collapsing columns within a user interface.

Although grouping module 272 is illustrated as implemented within computing device 250 in the example of FIG. 2, some or all aspects of grouping module 272 may be implemented elsewhere, such as through a remote server. In one such implementation, grouping module 272 may implemented within a cloud-based computing system operating on data 276. Computing device 250 may be implemented as a thin client device that presents a user interface that is partially or fully generated by the remote cloud-based computing system, and retrieved over a network accessible to computing device 250 through communication unit 255.

One or more application modules 279 may represent some or all of the other various individual applications and/or services executing at and accessible from computing device 250. A user of computing device 250 may interact with a graphical user interface associated with one or more application modules 279 to cause computing device 250 to perform a function. Numerous examples of application modules 279 may exist and may include web browsing, search, communication, and shopping applications, and any and all other applications that may execute at computing device 250.

Modules illustrated in FIG. 2 (e.g., user interface module 271 and grouping module 272) and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device. Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated. Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

Data 276 represents any data that is structured, or is susceptible to being structured, in a tabular, column-based, and/or row-based format. Data 276 may be stored in any appropriate storage medium, and may be local to computing device 250 or accessible to computing device 250 over a network. Data 276 may be consistent in terms of format and structure with the data illustrated in the illustrations described herein, or data 276 may be of a different type or character. Although illustrated as stored within computing device 250, in other examples, data 276 may be stored elsewhere, including remotely. The example of FIG. 2 illustrates example columns that may be associated with data 276. In the example shown, data 276 includes column 201 through column 211.

FIG. 3A, FIG. 3B, FIG. 3C, FIG. 3D, and FIG. 3E are conceptual diagrams illustrating example user interfaces presented by an example computing device in accordance with one or more aspects of the present disclosure. User interfaces illustrated in FIG. 3A through FIG. 3E may correspond to a user interface output by display 262 of FIG. 2, and may be a graphical user interface, a text-based user interface, a console or command-based user interface, or other type of user interface. One or more aspects of the user interfaces illustrated in FIG. 3A through FIG. 3E may be described herein within the context of computing device 250 and data 276 of FIG. 2. The illustrated user interfaces represent one example or possible implementation; other example or alternate implementations are contemplated and may be appropriate in other instances.

Computing device 250 may determine that data 276 does not fit well on display 262. For instance, in some examples, input device 264 of computing device 250 detects input and outputs to user interface module 271 an indication of input. User interface module 271 outputs to grouping module 272 information about the input. Grouping module 272 determines that the input corresponds to a request to present data 276 at display 262. In response to the request, grouping module 272 identifies an appropriate font and/or other display parameters for presenting data 276 at display 262. Grouping module 272 may also determine, based on the size and/or resolution of display 262, and further based on the size of a window or other display region in which data 276 is to be presented, that not all of the columns of data 276 will be visible on display 262 if data 276 is presented in a tabular format using the identified display parameters.

Accordingly, in the example of FIG. 3A, and in accordance with one or more aspects of the present disclosure, computing device 250 may present data 276 with one or more columns grouped. For instance, with reference to FIG. 2, grouping module 272 analyzes data 276 and determines that the heading names associated with column 205, column 206, and column 207 (i.e., the data in the first row of column 205, column 206, and column 207) all start with the word "Source." Grouping module 272 determines, based at least on this similarity between column 205, column 206, and column 207, that these columns are sufficiently related to be grouped when presented on display 262. Grouping module 272 also determines that the heading names associated with column 208 and column 209 all start with the word "Destination." Grouping module 272 determines, based at least on this similarity between column 208 and column 209, that these columns (column 208 and column 209) are also sufficiently related to be grouped when presented on display 262. Grouping module 272 generates user interface 300A, and causes user interface module 271 to present user interface 300A at display 262 as illustrated in FIG. 3A.

In the example of FIG. 3A, computing device 250 presents user interface 300A within window 350 on display 262. User interface 300A includes grouped column 305, which represents the data of column 205, column 206, and column 207. The data from column 205 is presented in grouped column 305. The data from column 206 and column 207 is not shown in user interface 300A, but grouped column 305 is presented with a bold outline to indicate that grouped column 305 includes other hidden or partially hidden columns (i.e., column 206 and column 207). Similarly, in the example of FIG. 3A, user interface 300A includes grouped column 308, which represents the data of column 208 and column 209. The data from column 208 is presented in grouped column 308. The data from column 209 is not shown in user interface 300A, but grouped column 308 is presented with a bold outline to indicate that grouped column 308 includes and/or encompasses another column (i.e., column 209).

Although grouped column 305 and grouped column 308 are presented with a bold outline in the example of FIG. 3A, in other examples, computing device 250 may present grouped column 305 and/or grouped column 308 in other ways to indicate that these columns represent a grouped or combined column. For example, computing device 250 may present grouped column 305 and/or grouped column 308 with alternative colors, three-dimensional effects, or drop shadow styling. Further, computing device 250 may also present grouped column 305 and/or grouped column 308 with an indication of how many additional columns are grouped with grouped column 305 and/or grouped column 308. In the example of FIG. 3A, such an indication is in the form of a "+2" included within the heading of grouped column 305 and a "+1" included within the heading of grouped column 308.

In some examples, computing device 250 expands one or more grouped columns in response to user input. For example, with reference to FIG. 3A and FIG. 2, input device 264 detects one or more interactions with user interface 300A at or near where display 262 presents the heading of grouped column 305 (see cursor 352). Input device 264 outputs to user interface module 271 an indication of input. User interface module 271 outputs to grouping module 272 information about the input. Grouping module 272 determines that the input corresponds to a user selecting, using cursor 352, the heading or first row of grouped column 305. Grouping module 272 interprets such input as a request to expand grouped column 305. In response, grouping module 272 generates user interface 300B and causes user interface module 271 to present user interface 300B at input device 264 as illustrated in FIG. 3B.

In the example of FIG. 3B, computing device 250 presents user interface 300B within window 350. User interface 300B includes columns column 205, column 206, and column 207, which were hidden as part of grouped column 305 in FIG. 3A. In the example shown, computing device 250 presents the first row of column 205, column 206, and column 207 surrounded by a bold outline within user interface 300B to indicate that those columns are part of a column group. In some examples, computing device 250 may also present group closure icon 353 within user interface 300B, indicating that column 207 is the right-most column of a column group. Computing device 250 may respond to interactions with group closure icon 353 by collapsing column 205, column 206, and column 207 into a single column in a manner similar to that illustrated in FIG. 3A.

In the example of FIG. 3B, the columns included within user interface 300B occupy more horizontal space than is available within window 350, so computing device 250 presents user interface 300B with scroll bar 356. Computing device 250 may respond to interactions with scroll bar 356 by adjusting which columns are visible within window 350. In other examples, rather than presenting scroll bar 356 within user interface 300B, computing device 250 may combine other columns into a single grouped column. In such an example, computing device 250 may be able to provide a visual representation of all of the columns of data 276, with some of the columns being represented by a grouped column.

Computing device 250 may further expand one or more additional grouped columns in response to user input. For instance, in the example of FIG. 3B, and with reference to FIG. 2, input device 264 detects one or more interactions with user interface 300B where display 262 presents grouped column 308 or the first row of grouped column 308. Input device 264 outputs to user interface module 271 an indication of input. User interface module 271 outputs to grouping module 272 information about the input. Grouping module 272 determines that the input corresponds to a user selecting grouped column 308. Grouping module 272 interprets this input as a request to expand grouped column 308. In response, grouping module 272 generates user interface 300C and causes user interface module 271 to present user interface 300C at input device 264 as illustrated in FIG. 3C.

In the example of FIG. 3C, computing device 250 presents user interface 300C within window 350. User interface 300C includes columns column 208 and column 209. In the examples of FIG. 3A and FIG. 3B, column 208 and column 209 were presented as grouped column 308. User interface 300C is wider than can be viewed within window 350, so in FIG. 3C, computing device 250 presents user interface 300C with scroll bar 356. And as in FIG. 3B, computing device 250 may respond to interactions with scroll bar 356 in FIG. 3C by adjusting which columns are visible within user interface 300C.

Computing device 250 may, in response to user input, adjust which columns are included within a group. For instance, in the example of FIG. 3C, and with reference to FIG. 2, input device 264 detects one or more interactions with user interface 300C where display 262 presents the first row of column 203. Input device 264 outputs to user interface module 271 an indication of input. User interface module 271 outputs to grouping module 272 information about the input. Grouping module 272 determines that the input corresponds to a user dragging (using cursor 352) the first cell of column 203 to a location on user interface 300C between column 205 and column 206. Grouping module 272 interprets such input as a request to move column 203 to a location between column 205 and column 206. In response to the input, grouping module 272 generates user interface 300D and causes user interface module 271 to present user interface 300D at display 262 as illustrated in FIG. 3D.

In the example of FIG. 3D, computing device 250 presents 300D within window 350, where column 203 has been moved to a position between column 205 and column 206. Also, computing device 250 presents column 203 within user interface 300D as part of the group previously including column 205, column 206, and column 207. For instance, computing device 250 presents a bold outline around the headers of columns column 205, column 203, column 206, and column 207.

Computing device 250 may, in response to user input, determine which column to make visible when a column group is collapsed. For instance, in the example of FIG. 3D, and with reference to FIG. 2, input device 264 detects one or more interactions with user interface 300D at or near where input device 264 presents the first row (or, in some examples, any row) of column 207. Input device 264 outputs to user interface module 271 an indication of input. User interface module 271 outputs to grouping module 272 information about the input. Grouping module 272 determines that the input corresponds to a request to present a context menu associated with column 207. For example, grouping module 272 may determine that a user has performed a right-click with a mouse or other pointing device. In response to the input, grouping module 272 presents context menu 360 as illustrated in user interface 300D. Input device 264 further detects interactions with user interface 300D where input device 264 presents menu item 362 within context menu 360. User interface module 271 determines that such interactions correspond to a request, by a user, to show column 207 when the group of columns consisting of column 205, column 203, column 206, and column 207 is collapsed or presented as a single column. In some examples, computing device 250 may reorder the columns presented within user interface 300D in response to the user's request, so that, for example, column 207 is the left-most column within the group of columns consisting of consisting of column 205, column 203, column 206, and column 207.

Computing device 250 may make column 207 visible when the column group including column 207 is collapsed, as illustrated in FIG. 3E. For instance, in the example of FIG. 3D, and with reference to FIG. 2, input device 264 detects one or more interactions with user interface 300D at or near where display 262 presents group closure icon 353. Input device 264 outputs to user interface module 271 an indication of input. User interface module 271 outputs to grouping module 272 information about the input. Grouping module 272 determines that the input corresponds to a user selecting group closure icon 353 with a pointing device. Grouping module 272 interprets such input as a request to collapse the group that includes column 205, column 203, column 206, and column 207. In response, grouping module 272 generates user interface 300E and causes user interface module 271 to present user interface 300E at display 262 as illustrated in FIG. 3E.

In the example of FIG. 3E, computing device 250 presents user interface 300E within window 350. User interface 300E includes column 205, column 203, column 206, and column 207 combined into grouped column 307. The data from column 207 is visible in grouped column 307. The data from the other columns in the group are not shown in user interface 300E, but grouped column 307 includes one or more visual effects to indicate that grouped column 307 includes other hidden columns (e.g., bold outline, a "+3" in the first column of grouped column 307, and/or another indication).

Figure 4A:
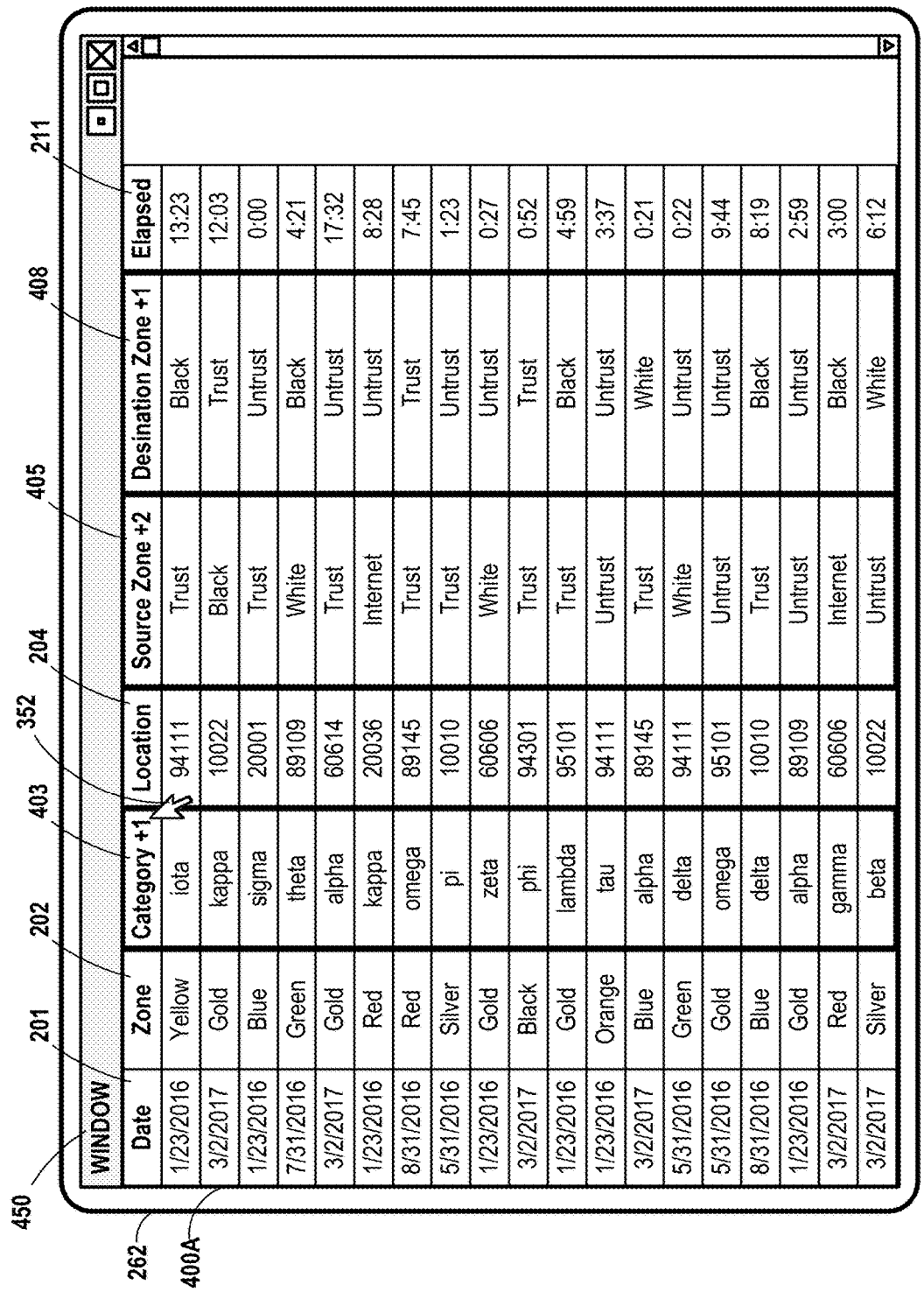

FIG. 4A and FIG. 4B are conceptual diagrams illustrating example user interfaces corresponding to an alternate column grouping scenario performed by an example computing device, in accordance with one or more aspects of the present disclosure. User interfaces illustrated in FIG. 4A through FIG. 4E may correspond to a user interface output by display 262 of FIG. 2, and may be a graphical user interface, a text-based user interface, a console or command-based user interface, or other type of user interface. One or more aspects of the user interfaces illustrated in FIG. 4A through FIG. 4E may be described herein within the context of computing device 250 and data 276 of FIG. 2. The illustrated user interfaces represent one example or possible implementation; other example or alternate implementations are contemplated and may be appropriate in other instances.

Computing device 250 may group columns based on the type of data included in each column. For instance, in the example of FIG. 4A, and with reference to FIG. 2, grouping module 272 analyzes data 276 and determines that the data included within column 203 consists of, or primarily consists of, names of Greek letters. Grouping module 272 further analyzes data 276 and determines that the data included within column 210 also consists of, or primarily consists of, names of Greek letters. Grouping module 272 determines, based at least on this similarity between column 203 and column 210, that these columns are sufficiently related to be grouped together in some situations. In response to user input that grouping module 272 interprets as a request to present data 276, grouping module 272 generates user interface 400A, and causes user interface module 271 to present user interface 400A as illustrated in FIG. 4A.

In the example of FIG. 4A, computing device 250 presents user interface 400A within window 450. User interface 400A includes grouped column 403, which represents the data of column 203 and column 210, and which computing device 250 has grouped based on the similarity of the type of data of column 203 and column 210. Computing device 250 presents the data from column 203 in grouped column 403. The data from column 210 is not shown in user interface 400A. Computing device 250 presents grouped column 403 with a bold outline to indicate that grouped column 403 includes at least one other hidden (or partially hidden) column (i.e., column 210). Also in this example, grouped column 406 represents a group of columns consisting of column 205, column 206, and column 207. Similarly, grouped column 408 represents a group of columns consisting of column 208 and column 209.

Computing device 250 may expand columns included within grouped column 403 in response to user input. For instance, in the example of FIG. 4A, and with reference to FIG. 2, input device 264 detects one or more interactions with user interface 400A at or near where display 262 presents the first row of grouped column 403. Input device 264 outputs to user interface module 271 an indication of input. User interface module 271 outputs to grouping module 272 information about the input. Grouping module 272 determines that the input corresponds to a user selecting the cell in the first row of grouped column 403. In response, grouping module 272 generates user interface 400B and causes user interface module 271 to present user interface 400B at display 262 as illustrated in FIG. 4B.

In the example of FIG. 4B, computing device 250 presents user interface 400B within window 450. Computing device 250 presents user interface 400B so that both column 203 and column 210 are visible. Computing device 250 also presents user interface 400B so that column 203 and column 210 are adjacent, since column 203 and column 210 have been identified as a column group based on the type of data stored within column 203 and column 210.

FIG. 5A, FIG. 5B, and FIG. 5C are conceptual diagrams illustrating example user interfaces corresponding to a grouping scenario performed by an example computing device in response to user input, in accordance with one or more aspects of the present disclosure. User interfaces illustrated in FIG. 5A through FIG. 5C may correspond to a user interface output by display 262 of FIG. 2, and may be a graphical user interface, a text-based user interface, a console or command-based user interface, or other type of user interface. One or more aspects of the user interfaces illustrated in FIG. 5A through FIG. 5C may be described herein within the context of computing device 250 of FIG. 2. The illustrated user interfaces represent one example or possible implementation; other example or alternate implementations are contemplated and may be appropriate in other instances.

In the example of FIG. 5A, and with reference to FIG. 2, grouping module 272 generates user interface 500A and causes user interface module 271 to present user interface 500A within window 550 on display 262 as illustrated in FIG. 5A. In user interface 500A, computing device 250 has presented column 205, column 206, and column 207 as grouped column 505. Further, computing device 250 has presented column 208 and column 209 as grouped column 508.

Computing device 250 may, in response to user input, identify columns to group. For instance, in the example of FIG. 5A, and with reference to FIG. 2, input device 264 detects interactions with user interface 500A. Input device 264 outputs to user interface module 271 one or more indications of input. User interface module 271 outputs to grouping module 272 information about the input. Grouping module 272 determines that the input corresponds to selection (e.g., using cursor 352) of column 202 and column 210. In response, grouping module 272 causes column 202 and column 210 to be highlighted or shaded as illustrated in FIG. 5A.

Computing device 250 may, in response to input, group the identified columns. For instance, in the example of FIG. 5A, and with reference to FIG. 2, grouping module 272 further receives an indication of input that it determines corresponds to a request to present context menu 570. In response, grouping module 272 causes user interface module 271 to present context menu 570 as illustrated in FIG. 5A. Grouping module 272 further detects input that it determines corresponds to selection of context menu item 571. Grouping module 272 determines that such input is a request to group the selected columns (e.g., column 202 and column 210). In response, grouping module 272 generates user interface 500B and causes user interface module 271 to present user interface 500B at display 262.

In the example of FIG. 5B, computing device 250 presents user interface 500B within window 550. User interface 500B includes column 202 and column 210 presented as grouped column 502. In addition, column 205, column 206, and column 207 continue to be grouped as grouped column 505. Further, column 208 and column 209 are also grouped as grouped column 508.

Computing device 250 may, in response to user input, expand grouped column 502. For instance, in the example of FIG. 5B, and with reference to FIG. 2, input device 264 detects one or more interactions with user interface 500B where display 262 presents grouped column 502 or the first row of grouped column 502. Input device 264 outputs to user interface module 271 an indication of input. User interface module 271 outputs to grouping module 272 information about the input. Grouping module 272 determines that the input corresponds to a user selecting grouped column 502. In response, grouping module 272 generates user interface 500C and causes user interface module 271 to present user interface 500C at display 262, as illustrated in FIG. 5C.

In the example of FIG. 5C, computing device 250 presents user interface 500C within window 550. In user interface 500C, computing device 250 has replaced grouped column 502 with column 202 and column 210. Further, since column 202 and column 210 are part of a column group, computing device 250 has moved column 210 so that its position is adjacent to column 202. In other words, in the example of FIG. 5A, FIG. 5B, and FIG. 5C, computing device 250 adjusts the position of column 210 automatically in response to column 210 being grouped with column 202. In other examples, computing device 250 might not automatically adjust the position of column 210. In such an example, when grouped column 502 is expanded, computing device 250 may present column 210 at its original position (e.g., in the order presented in FIG. 5A).

FIG. 6A, FIG. 6B, and FIG. 6C are conceptual diagrams illustrating example user interfaces illustrating changes to user interfaces in response to resizing operations, in accordance with one or more aspects of the present disclosure. User interfaces illustrated in FIG. 6A through FIG. 6C may correspond to a user interface output by display 262 of FIG. 2, and may be a graphical user interface, a text-based user interface, a console or command-based user interface, or other type of user interface. One or more aspects of the user interfaces illustrated in FIG. 6A through FIG. 6C may be described herein within the context of computing device 250 of FIG. 2. The illustrated user interfaces represent one example or possible implementation; other example or alternate implementations are contemplated and may be appropriate in other instances.

Computing device 250 may, when presenting data 276, group columns of data 276 based the size of the window in which data 276 is to be presented. For instance, in the example of FIG. 6A, and with reference to FIG. 2, input device 264 detects input and outputs to user interface module 271 an indication of input. User interface module 271 outputs to grouping module 272 information about the input. Grouping module 272 determines that the input corresponds to a request to present data 276 within window 650 on display 262. In response to the request, grouping module 272 identifies an appropriate font and/or other display parameters for presenting data 276. Grouping module 272 may also determine, based on the size of window 650, and further based on the size and/or resolution of display 262, that not all of the columns of data 276 will fit within window 650 if data 276 is presented in a tabular format using appropriate display parameters. Accordingly, grouping module 272 generates user interface 600A and presents data 276 within window 650 as illustrated in FIG. 6A.

In the example of FIG. 6A, computing device 250 presents user interface 600A within window 650. User interface 600A presents column 202 and column 210 as grouped column 602. Grouping module 272 has grouped and presented column 205, column 206, and column 207 as grouped column 605 in user interface 600A. Further, grouping module 272 has grouped and presented column 208 and column 209 as grouped column 608. In addition, grouping module 272 has grouped column 203 and column 204, but has not presented column 203 and column 204 as one column in user interface 600A because grouping module 272 has determined that, based on the size of window 650, presenting column 203 and column 204 as one column is not necessary in order to represent all columns within window 650, and avoid use of a horizontal scroll bar.

Computing device 250 may expand groups automatically as window 650 is made larger. For instance, in the example of FIG. 6A, and with reference to FIG. 2, input device 264 detects input and outputs to user interface module 271 an indication of input. User interface module 271 outputs to grouping module 272 information about the input. Grouping module 272 determines that the input corresponds to a request to resize window 650 so that window 650 is larger or maximized on display 262. Grouping module 272 determines that when window 650 is made larger, it will not be necessary to present columns column 202 and column 203 as grouped column 602 in order to fit column 202 and column 203 within window 650. However, grouping module 272 further determines that if any other grouped columns (e.g., grouped column 605, grouped column 608) are expanded, window 650 will not be large enough to represent all columns of data 276 without use of a horizontal scroll bar. Accordingly, grouping module 272 generates user interface 600B expanding grouped column 602, but not expanding grouped column 605 and grouped column 608. Grouping module 272 causes user interface module 271 to present user interface 600B at input device 264 as illustrated in FIG. 6B.

In the example of FIG. 6B, computing device 250 presents user interface 600B within window 650, after window 650 has been made larger on display 262 relative to the size of window 650 as illustrated in FIG. 6A. User interface 600B presents column 202 and column 210 individually, rather than as grouped column 602. However, user interface 600B presents grouped column 605 and grouped column 608, as in FIG. 6A. Window 650 in FIG. 6B is large enough to present the columns included in user interface 600B without a horizontal scroll bar.

Computing device 250 may collapse groups automatically as window 650 is made smaller. For instance, referring again to the example of FIG. 6A, and with reference to FIG. 2, input device 264 detects input and outputs to user interface module 271 an indication of input. User interface module 271 outputs to grouping module 272 information about the input. Grouping module 272 determines that the input corresponds to a request to resize window 650 so that window 650 is smaller. Grouping module 272 determines that when window 650 is made smaller, the columns presented in 600A of FIG. 6A will not fit within the smaller window 650. Grouping module 272 further determines that if column 203 and column 204 are grouped and presented as grouped column 603, the other columns presented in user interface 600A will fit within the smaller window 650, and a horizontal scroll bar will not be necessary. Accordingly, grouping module 272 generates user interface 600C collapsing column 203 and column 204, and causes user interface module 271 to present user interface 600C at input device 264 as illustrated in FIG. 6C.

In the example of FIG. 6C, computing device 250 presents user interface 600C within window 650B, after window 650 has been made smaller relative to the size of window 650 as illustrated in FIG. 6A. User interface 600C presents column 203 and column 204 as grouped column 603. Further, as in FIG. 6A, user interface 600C presents column 202 and column 210 as grouped column 602. User interface 600C presents column 203 and column 204 as grouped column 603, column 205, column 206, and column 207 as grouped column 605, and column 208 and column 209 as grouped column 608.

Figure 7:
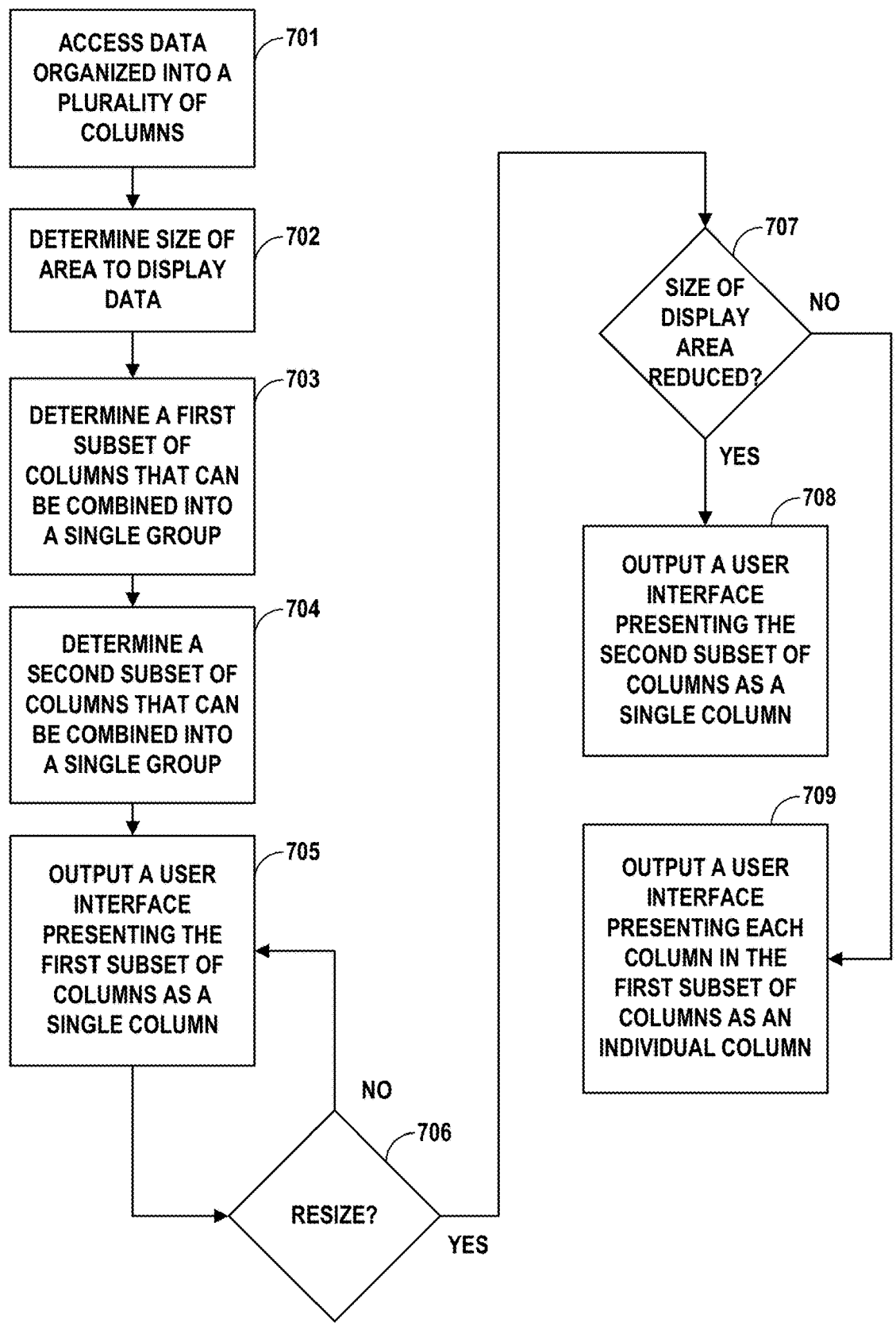
FIG. 7 is a flow diagram illustrating an example process for performing operations in accordance with one or more aspects of the present disclosure.

FIG. 7 is a flow diagram illustrating an example process for performing operations in accordance with one or more aspects of the present disclosure. In the example of FIG. 7, the process of FIG. 7 may be performed by computing device 250. In other examples, different operations may be performed, or operations described in connection with FIG. 7 may be performed by one or more other components, modules, systems, and/or devices. Further, in other examples, operations described in connection with FIG. 7 may be merged, performed in a difference sequence, or omitted.

In the example of FIG. 7, and in accordance with one or more aspects of the present disclosure, computing device 250 may access data organized into a plurality of columns (701). For instance, in some examples, input device 264 of computing device 250 detects input and outputs to user interface module 271 an indication of input. User interface module 271 outputs to grouping module 272 information about the input. Grouping module 272 determines that the input corresponds to a request to present data 276 at display 262.

Computing device 250 may determine the size of the area to display data (702). For instance, in some examples, grouping module 272 of computing device 250 determines, based on one or more parameters, the size of the area in which data 276 is to be displayed. The parameters may include the size and/or resolution of input device 264, the size of a window or other display element in which data 276 is to be presented, and/or other parameters, such as font and font size.

Computing device 250 may determine a first subset of columns that can be combined into a group (703). For instance, in some examples, grouping module 272 of computing device 250 determines, based data such as column heading data or the data type associated with the data stored in columns within data 276, a set of columns that can be combined into a single group.

Computing device 250 may determine a second subset of columns that can be combined into a group (704). For instance, in some examples, grouping module 272 of computing device 250 again determines, based on metadata or input from the user, another set of columns that can be combined into a single group. Where grouping module 272 uses metadata to identify the first subset of columns, the metadata could be the same as or different from the metadata used to identify the first subset of columns.

Computing device 250 may output a user interface presenting the first subset of columns as a single column (705). For instance, in some examples, grouping module 272 of computing device 250 determines that in order to represent all columns within the display area, the first subset of columns should be grouped into a single column. Grouping module 272 also determines that grouping the first subset of columns is sufficient to ensure that all columns are presented on display 262 without a horizontal scroll bar, so grouping module 272 determines that the second subset of columns need not be grouped into a single column. Grouping module 272 generates a user interface and causes user interface module 271 to presents the user interface at display 262.

Computing device 250 may detect input that it determines corresponds to a request to resize the window or display area in which data 276 is displayed (706). For instance, in some examples, input device 264 detects input and outputs to user interface module 271 an indication of input. User interface module 271 outputs to grouping module 272 informational about the input. Grouping module 272 determines that the input corresponds to a request to resize the window or display area in which data 276 is displayed.

Computing device 250 may output a user interface presenting the second subset of columns as a single column (708). For instance, grouping module 272 of computing device 250 determines that the input corresponds to a request to reduce the size of the window. Grouping module 272 determines that in order to represent all columns within the display area, the second subset of columns should be grouped into a single column. Accordingly, grouping module 272 generates a user interface with the columns in both the first subset and the second subset collapsed, and causes user interface module 271 to present the user interface at display 262.

Computing device 250 may output a user interface presenting each column in the first subset of columns as an individual column (709). For instance, grouping module 272 of computing device 250 determines that the input corresponds to a request to increase the size of the window. Grouping module 272 determines that since the window is larger, it is no longer necessary to group the first subset of columns as a single column in order to represent all columns within the display area. Accordingly, grouping module 272 generates a user interface with the columns in both the first and second subset of columns expanded, and causes user interface module 271 to present the user interface at display 262.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

Clause 1. A method comprising: accessing, by a computing device, data organized into a plurality of columns, each column having one or more characteristics; determining, by the computing device and based on at least some of the characteristics of the columns, one or more column groups, each column group including a subset of the plurality of columns; determining, by the computing device and based on attributes of a window for presentation of the data, whether the plurality of columns will fit within the window; and in response to determining that the plurality of columns will not fit within the window, outputting a user interface presenting a column group as a single column within the window so that the plurality of columns fits within the window.

Clause 2. The method of any other clause, including clause 1, wherein the column group is a first column group, and wherein outputting a user interface includes: outputting a user interface presenting a second column group by presenting each of the columns within the second column group individually within the window.

Clause 3. The method of any other clause, including clause 2, further comprising: receiving, by the computing device, an indication of input increasing the size of the window; determining, by the computing device, that the window size has been increased enough to individually present each column within the first column group within the window; and outputting an updated user interface presenting the first column group by presenting each column within the first column group individually within the window.

Clause 4. The method of any other clause, including clause 2, further comprising: receiving, by the computing device, an indication of input decreasing the size of the window; determining, by the computing device, that the window size has been decreased enough so that the plurality of columns will not fit within the window; and outputting an updated user interface presenting the second column group as a single column within the window so that the plurality of columns fits within the window.

Clause 5. The method of any other clause, including clause 2, receiving, by the computing device, an indication of input requesting expansion of the first column group; and responsive to the indication of input, outputting an updated user interface presenting each column within the first column group individually within the window, and so that the plurality of columns does not fit within the window.

Clause 6. The method of any other clause, including clause 2, receiving, by the computing device, an indication of input requesting collapse of the second column group; and responsive to the indication of input, outputting an updated user interface presenting the second column group by presenting the second column group as a single column within the window.

Clause 7. The method of any other clause, including clause 1, wherein the characteristics of the columns include at least one of: a column name, a type of data stored in each column, and a position of each column within the data.

Clause 8. The method of any other clause, including clause 1, wherein determining one or more column groups includes determining one or more column groups based on at least one of: user input, a type of data stored in one or more columns, and a column name associated with one or more columns.

Clause 9. A computing system comprising: processing circuitry; and at least one storage device that stores instructions that, when executed, configure the processing circuitry to: access data organized into a plurality of columns, each column having one or more characteristics, determine, based on at least some of the characteristics of the columns, one or more column groups, each column group including a subset of the plurality of columns, determine, based on attributes of a window for presentation of the data, whether the plurality of columns will fit within the window, and in response to determining that the plurality of columns will not fit within the window, output a user interface presenting a column group as a single column within the window so that the plurality of columns fits within the window.

Clause 10. The computing system of any other clause, including clause 9, wherein the column group is a first column group, and wherein the instructions that configure the processing circuitry to output a user interface include instructions that, when executed, configure the processing circuitry to: output a user interface presenting a second column group by presenting each of the columns within the second column group individually within the window.

Clause 11. The computing system of any other clause, including clause 10, wherein the instructions, when executed, further configure the processing circuitry to: receive an indication of input increasing the size of the window; determine that the window size has been increased enough to individually present each column within the first column group within the window; and output an updated user interface presenting the first column group by presenting each column within the first column group individually within the window.

Clause 12. The computing system of any other clause, including clause 10, wherein the instructions, when executed, further configure the processing circuitry to: receive an indication of input decreasing the size of the window; determine that the window size has been decreased enough so that the plurality of columns will not fit within the window; and output an updated user interface presenting the second column group as a single column within the window so that the plurality of columns fits within the window.

Clause 13. The computing system of any other clause, including clause 10, wherein the instructions, when executed, further configure the processing circuitry to: receive an indication of input requesting expansion of the first column group; and responsive to the indication of input, output an updated user interface presenting each column within the first column group individually within the window, and so that the plurality of columns does not fit within the window.

Clause 14. The computing system of any other clause, including clause 10, wherein the instructions, when executed, further configure the processing circuitry to: receive an indication of input requesting collapse of the second column group; and responsive to the indication of input, output an updated user interface presenting the second column group by presenting the second column group as a single column within the window.

Clause 15. A computer-readable storage medium comprising instructions that, when executed, configure one or more processors of a computing system to: access data organized into a plurality of columns, each column having one or more characteristics; determine, based on at least some of the characteristics of the columns, one or more column groups, each column group including a subset of the plurality of columns; determine, based on attributes of a window for presentation of the data, whether the plurality of columns will fit within the window; and in response to determining that the plurality of columns will not fit within the window, output a user interface presenting a column group as a single column within the window so that the plurality of columns fits within the window.

Clause 16. The computer-readable storage medium of any other clause, including clause 15, wherein the column group is a first column group, and wherein the instructions that configure the one or more processors to output a user interface include instructions that, when executed, configure the processing circuitry to: output a user interface presenting a second column group by presenting each of the columns within the second column group individually within the window.

Clause 17. The computer-readable storage medium of any other clause, including clause 16, wherein the instructions, when executed, further configure the one or more processors to: receive an indication of input increasing the size of the window; determine that the window size has been increased enough to individually present each column within the first column group within the window; and output an updated user interface presenting the first column group by presenting each column within the first column group individually within the window.

Clause 18. The computer-readable storage medium of any other clause, including clause 16, wherein the instructions, when executed, further configure the one or more processors to: receive an indication of input decreasing the size of the window; determine that the window size has been decreased enough so that the plurality of columns will not fit within the window; and output an updated user interface presenting the second column group as a single column within the window so that the plurality of columns fits within the window.

Clause 19. The computer-readable storage medium of any other clause, including clause 16, wherein the instructions, when executed, further configure the one or more processors to: receive an indication of input requesting expansion of the first column group; responsive to the indication of input, output an updated user interface presenting each column within the first column group individually within the window, and so that the plurality of columns does not fit within the window.

Clause 20. The computer-readable storage medium of any other clause, including clause 16, wherein the instructions, when executed, further configure the one or more processors to: receive an indication of input requesting collapse of the second column group; responsive to the indication of input, output an updated user interface presenting the second column group by presenting the second column group as a single column within the window.

Clause 21. A system comprising means for performing any of the methods of any prior clause.

Clause 22. A computing device comprising means for performing any of the methods of any prior clause.

In one or more examples, the functions described may be implemented in hardware, software, firmware, or any combination thereof. If implemented in software, the functions may be stored, as one or more instructions or code, on and/or transmitted over a computer-readable medium and executed by a hardware-based processing unit. Computer-readable media may include computer-readable storage media, which corresponds to a tangible medium such as data storage media, or communication media including any medium that facilitates transfer of a computer program from one place to another (e.g., pursuant to a communication protocol). In this manner, computer-readable media may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the terms "processor" or "processing circuitry" as used herein may each refer to any of the foregoing structure or any other structure suitable for implementation of the techniques described. In addition, in some examples, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, a mobile or non-mobile computing device, a wearable or non-wearable computing device, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperating hardware units, including one or more processors as described above, in conjunction with suitable software and/or firmware.

What is claimed is:

1. A method comprising:
   accessing, by a computing device, data organized into a plurality of columns, each column having one or more data characteristics, including a data type characteristic specified within the data and associated with each item of data within the column;
   determining, by the computing device and based on the data type characteristic for each of the plurality of columns, a plurality of column groups, each column group including a subset of the plurality of columns, with each column in each of the plurality of column groups having the same data type characteristic;
   determining, by the computing device and based on attributes of a window for presentation of the data, whether the plurality of columns will fit within the window; and
   in response to determining that the plurality of columns will not fit within the window, outputting a user interface presenting a first column group of the plurality of column groups as a single column within the window representing the first column group so that the plurality of columns fits within the window, and wherein presenting the first column group includes presenting a column of data from one of the columns in the first column group, and hiding data from other columns in the first column group.

2. The method of claim 1, wherein outputting a user interface includes:
   outputting a user interface presenting a second column group by presenting each of the columns within the second column group individually within the window.

3. The method of claim 2, further comprising:
   receiving, by the computing device, an indication of input increasing the size of the window;
   determining, by the computing device, that the window size has been increased enough to individually present each column within the first column group within the window; and
   outputting an updated user interface presenting the first column group by presenting each column within the first column group individually within the window.

4. The method of claim 2, further comprising:
   receiving, by the computing device, an indication of input decreasing the size of the window;
   determining, by the computing device, that the window size has been decreased enough so that the plurality of columns will not fit within the window; and
   outputting an updated user interface presenting the second column group as a single column within the window so that the plurality of columns fits within the window, wherein the single column includes data from one of the columns in the second column group, and wherein data from the other columns in the second column group is hidden.

5. The method of claim 2,
   receiving, by the computing device, an indication of input requesting expansion of the first column group; and
   responsive to the indication of input, outputting an updated user interface presenting each column within the first column group individually within the window, and so that the plurality of columns does not fit within the window.

6. The method of claim 2,
   receiving, by the computing device, an indication of input requesting collapse of the second column group; and
   responsive to the indication of input, outputting an updated user interface presenting the second column group by presenting the second column group as a single column within the window.

7. The method of claim 1, wherein the data characteristics of the columns further include at least one of: a column name, metadata associated with each column, and data stored within each column.

8. The method of claim 1, wherein determining one or more column groups includes determining one or more column groups further based on at least one of: user input, and a column name associated with one or more columns.

9. A computing system comprising:
processing circuitry; and
at least one storage device that stores instructions that, when executed, configure the processing circuitry to:
access data organized into a plurality of columns, each column having one or more data characteristics, including a data type characteristic specified within the data and associated with each item of data within the column,
determine, based on the data type characteristic for each of the plurality of columns, a plurality of column groups, each column group including a subset of the plurality of columns, with each column in each of the plurality of column groups having the same data type characteristic,
determine, based on attributes of a window for presentation of the data, whether the plurality of columns will fit within the window, and
in response to determining that the plurality of columns will not fit within the window, output a user interface presenting a first column group of the plurality of column groups as a single column within the window representing the first column group so that the plurality of columns fits within the window, and wherein presenting the first column group includes presenting a column of data from one of the columns in the first column group, and hiding data from other columns in the first column group.

10. The computing system of claim 9, wherein the instructions that configure the processing circuitry to output a user interface include instructions that, when executed, configure the processing circuitry to:
output a user interface presenting a second column group by presenting each of the columns within the second column group individually within the window.

11. The computing system of claim 10, wherein the instructions, when executed, further configure the processing circuitry to:
receive an indication of input increasing the size of the window;
determine that the window size has been increased enough to individually present each column within the first column group within the window; and
output an updated user interface presenting the first column group by presenting each column within the first column group individually within the window.

12. The computing system of claim 10, wherein the instructions, when executed, further configure the processing circuitry to:
receive an indication of input decreasing the size of the window;
determine that the window size has been decreased enough so that the plurality of columns will not fit within the window; and
output an updated user interface presenting the second column group as a single column within the window so that the plurality of columns fits within the window, wherein the single column includes data from one of the columns in the second column group, and wherein data from the other columns in the second column group is hidden.

13. The computing system of claim 10, wherein the instructions, when executed, further configure the processing circuitry to:
receive an indication of input requesting expansion of the first column group; and
responsive to the indication of input, output an updated user interface presenting each column within the first column group individually within the window, and so that the plurality of columns does not fit within the window.

14. The computing system of claim 10, wherein the instructions, when executed, further configure the processing circuitry to:
receive an indication of input requesting collapse of the second column group; and
responsive to the indication of input, output an updated user interface presenting the second column group by presenting the second column group as a single column within the window.

15. A non-transitory computer-readable storage medium comprising instructions that, when executed, configure one or more processors of a computing system to:
access data organized into a plurality of columns, each column having one or more data characteristics, including a data type characteristic specified within the data and associated with each item of data within the column;
determine, based on the data type characteristic for each of the plurality of columns, a plurality of column groups, each column group including a subset of the plurality of columns, with each column in each of the plurality of column groups having the same data type characteristic;
determine, based on attributes of a window for presentation of the data, whether the plurality of columns will fit within the window; and
in response to determining that the plurality of columns will not fit within the window, output a user interface presenting a first column group of the plurality of column groups as a single column within the window representing the first column group so that the plurality of columns fits within the window, and wherein presenting the first column group includes presenting a column of data from one of the columns in the first column group, and hiding data from other columns in the first column group.

16. The computer-readable storage medium of claim 15, wherein the instructions that configure the one or more processors to output a user interface include instructions that, when executed, configure the processing circuitry to:
output a user interface presenting a second column group by presenting each of the columns within the second column group individually within the window.

17. The non-transitory computer-readable storage medium of claim 16, wherein the instructions, when executed, further configure the one or more processors to:
receive an indication of input increasing the size of the window;
determine that the window size has been increased enough to individually present each column within the first column group within the window; and
output an updated user interface presenting the first column group by presenting each column within the first column group individually within the window.

18. The non-transitory computer-readable storage medium of claim 16, wherein the instructions, when executed, further configure the one or more processors to:
receive an indication of input decreasing the size of the window;

determine that the window size has been decreased enough so that the plurality of columns will not fit within the window; and output an updated user interface presenting the second column group as a single column within the window so that the plurality of columns fits within the window, wherein the single column includes data from one of the columns in the second column group, and wherein data from the other columns in the second column group is hidden.

19. The non-transitory computer-readable storage medium of claim 16, wherein the instructions, when executed, further configure the one or more processors to:

receive an indication of input requesting expansion of the first column group;

responsive to the indication of input, output an updated user interface presenting each column within the first column group individually within the window, and so that the plurality of columns does not fit within the window.

20. The non-transitory computer-readable storage medium of claim 16, wherein the instructions, when executed, further configure the one or more processors to:

receive an indication of input requesting collapse of the second column group;

responsive to the indication of input, output an updated user interface presenting the second column group by presenting the second column group as a single column within the window.

\* \* \* \* \*